US012095837B2

(12) United States Patent
Yu

(10) Patent No.: US 12,095,837 B2
(45) Date of Patent: *Sep. 17, 2024

(54) NORMALIZED RESOLUTION DETERMINATION FOR MULTIPLE VIDEO STREAM CAPTURE

(71) Applicant: Zoom Video Communications, Inc., San Jose, CA (US)

(72) Inventor: Chi-chian Yu, San Ramon, CA (US)

(73) Assignee: Zoom Video Communications, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/064,590

(22) Filed: Dec. 12, 2022

(65) Prior Publication Data
US 2023/0247073 A1 Aug. 3, 2023

Related U.S. Application Data

(63) Continuation of application No. 17/589,193, filed on Jan. 31, 2022, now Pat. No. 11,546,394.

(51) Int. Cl.
H04L 65/403 (2022.01)
G06T 7/20 (2017.01)
G06V 10/25 (2022.01)
G06V 20/40 (2022.01)
G06V 40/10 (2022.01)
G06V 40/20 (2022.01)
(Continued)

(52) U.S. Cl.
CPC .............. *H04L 65/403* (2013.01); *G06T 7/20* (2013.01); *G06V 10/25* (2022.01); *G06V 20/41* (2022.01);
(Continued)

(58) Field of Classification Search
CPC ...................... H04L 65/403; G06T 7/20; G06T 2207/10016; G06T 2207/30196;
(Continued)

(56) References Cited

U.S. PATENT DOCUMENTS 8,531,557 B2  9/2013  Wan et al.
8,773,498 B2  7/2014  Lindbergh
(Continued)

FOREIGN PATENT DOCUMENTS

WO   2016046589 A1   3/2016

OTHER PUBLICATIONS

International Search Report and Written Opinion mailed on May 15, 2023 in corresponding PCT Application No. PCT/US2023/011778.

*Primary Examiner* — Amara Abdi
(74) *Attorney, Agent, or Firm* — Young Basile Hanlon & MacFarlane, P.C.

(57) ABSTRACT

Normalized resolutions are determined for first and second regions of interest of an initial video stream captured by a video capture device located within a physical space. The first region of interest is associated with a first conference participant within the physical space and the second region of interest is associated with a second conference participant within the physical space. Instructions are transmitted to the video capture device to cause the video capture device to capture, at the normalized resolutions, a first video stream associated with the first region of interest and a second video stream associated with the second region of interest. The first and second video streams conform sizes and quality levels of the first and second conference participants within separate user interface tiles of a conferencing software user interface to which the first and second video streams are output.

19 Claims, 11 Drawing Sheets

(51) Int. Cl.
  *H04N 7/01* (2006.01)
  *H04N 23/60* (2023.01)
  *H04N 23/90* (2023.01)
(52) U.S. Cl.
  CPC .............. *G06V 40/10* (2022.01); *G06V 40/20* (2022.01); *H04N 7/0117* (2013.01); *H04N 23/64* (2023.01); *H04N 23/90* (2023.01); *G06T 2207/10016* (2013.01); *G06T 2207/30196* (2013.01); *G06V 2201/10* (2022.01)
(58) Field of Classification Search
  CPC ........ G06V 10/25; G06V 20/41; G06V 40/10; G06V 40/20; G06V 2201/10; H04N 5/23222; H04N 5/247; H04N 7/0117
  See application file for complete search history.

(56) References Cited

U.S. PATENT DOCUMENTS

| | | | |
|---|---|---|---|
| 8,832,193 B1 | 9/2014 | Lindberg et al. | |
| 10,104,338 B2 | 10/2018 | Goesnar | |
| 10,904,446 B1 | 1/2021 | Ostap et al. | |
| 10,965,909 B2 | 3/2021 | Tanaka et al. | |
| 10,999,344 B1 | 5/2021 | Babkin et al. | |
| 11,165,992 B1 | 11/2021 | Ong et al. | |
| 11,418,758 B2 | 8/2022 | Theien et al. | |
| 11,516,433 B1 | 11/2022 | Yan et al. | |
| 11,546,394 B1 | 1/2023 | Yu | |
| 2009/0144756 A1 | 6/2009 | Inami | |
| 2009/0153730 A1* | 6/2009 | Knee | G06T 7/194 348/E7.003 |
| 2009/0210789 A1 | 8/2009 | Thakkar et al. | |
| 2010/0157016 A1 | 6/2010 | Sylvain | |
| 2010/0171807 A1 | 7/2010 | Tysso | |
| 2011/0085017 A1 | 4/2011 | Robinson et al. | |
| 2015/0023407 A1 | 1/2015 | Sato | |
| 2016/0182593 A1* | 6/2016 | Denoual | H04N 21/2353 709/219 |
| 2016/0275354 A1 | 9/2016 | Andalo et al. | |
| 2017/0085790 A1* | 3/2017 | Bohn | H04N 23/90 |
| 2017/0236252 A1 | 8/2017 | Nguyen et al. | |
| 2018/0063482 A1* | 3/2018 | Goesnar | H04N 23/58 |
| 2019/0007623 A1 | 1/2019 | Wang et al. | |
| 2022/0171970 A1 | 6/2022 | Yadav et al. | |
| 2022/0374136 A1* | 11/2022 | Chang | G06F 3/04845 |

* cited by examiner

NORMALIZED RESOLUTION DETERMINATION FOR MULTIPLE VIDEO STREAM CAPTURE

CROSS-REFERENCE TO RELATED APPLICATION(S)

This application is a continuation of U.S. application Ser. No. 17/589,193, filed Jan. 31, 2022, the entire disclosure of which is herein incorporated by reference.

FIELD

This disclosure generally relates to normalizing resolutions for video streams output for display within a software user interface, and, more specifically, to determining normalized resolutions for regions of interest of an initial video stream and concurrently capturing multiple video streams for the regions of interest at the normalized resolutions.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
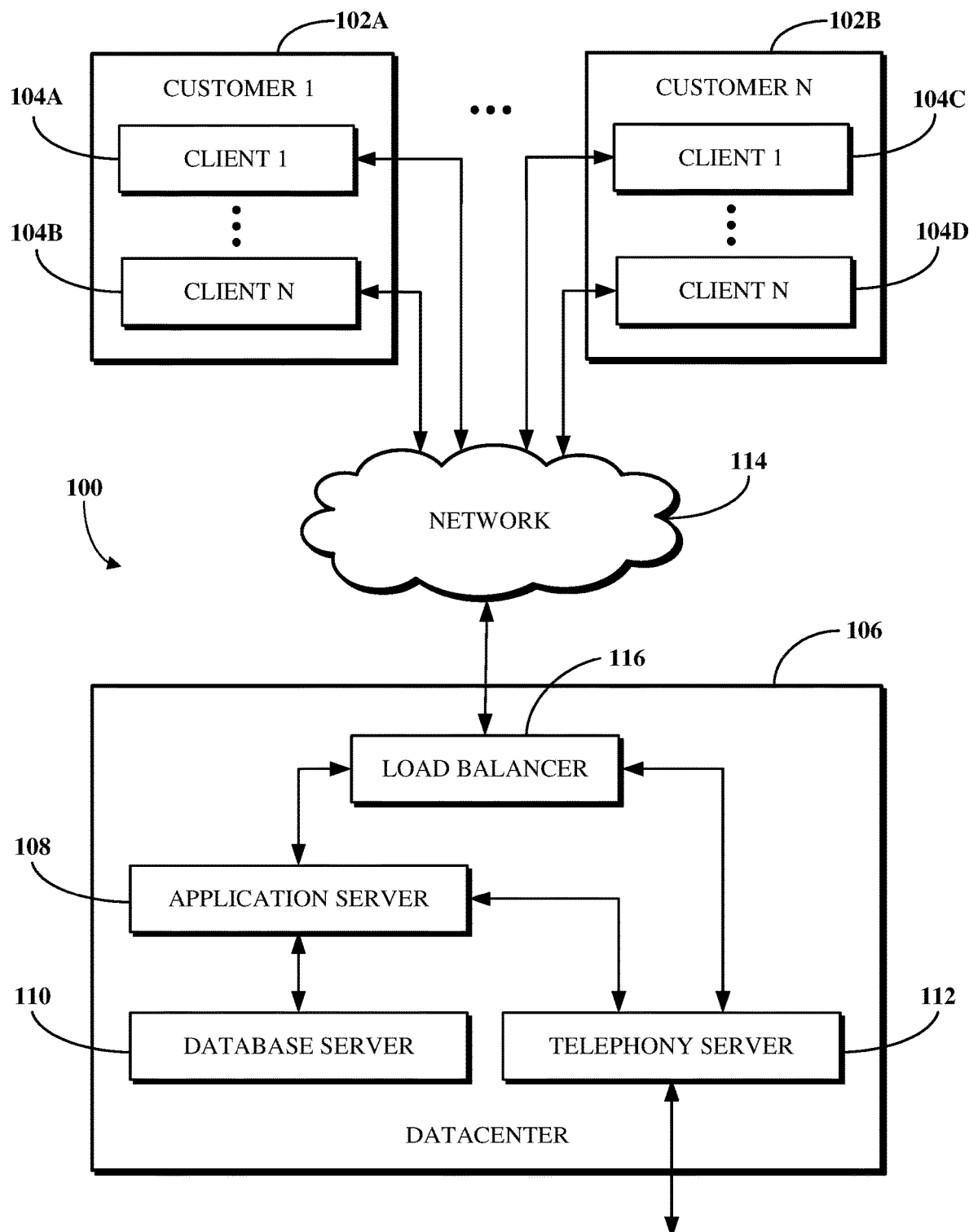
FIG. 1 is a block diagram of an example of an electronic computing and communications system.

Conferencing software is frequently used across various industries to support conferences between participants in multiple locations. In many cases, one or more of the conference participants is physically located in and connects to the conferencing software from a conference room (e.g., in an office setting), and other conference participants connect to the conferencing software from one or more remote locations. Conferencing software thus enables people to conduct conferences without requiring them to be physically present with one another. Conferencing software may be available as a standalone software product or it may be integrated within a software platform, such as a unified communications as a service (UCaaS) platform.

In many cases, conferencing software uses video media to output, in real-time, video streams captured from endpoints connected to the conferencing software. For people physically present within a physical space, such as a conference room, a computing device within the physical space serves as the endpoint. Typically, there is a single camera within a conference room, which is usually located in a central position on one side of the conference room so as to capture most or all of the conference room within a field of view thereof, and there may be one or more microphones throughout the conference room to capture sound from persons present in the conference room. These media capture devices are typically connected to the computing device within the conference room, which transmits streams thereof to a server that implements the conferencing software. The conferencing software then renders an output video stream based on the video feed from the camera within a user interface of the conferencing software (e.g., within a user interface tile associated with the conference room) and introduces an audio feed from the one or more microphones within an audio channel of the conference.

A user interface of conventional conferencing software includes a number of user interface tiles in which video feeds received from the various connected devices are separately rendered. Conference participants remotely connecting to conventional conferencing software are represented within a user interface of the conferencing software using individualized user interface tiles based on the video feeds received from their devices. In contrast, because a single video feed is received from the camera within a conference room, conference participants who are physically located within the conference room generally are all represented within the same user interface tile. However, the use of a single user interface tile to show all participants within a conference room may limit the contribution that those participants have to the overall conference experience over the conferencing software. For example, a conference participant located somewhere in the conference room will not be given the same amount of focus within the user interface of the conferencing software, which includes all of the user interface tiles, as someone who is front and center within their own individualized user interface tile. In another example, conversations between participants within the conference room may be missed or misattributed to others by remote participants who are not present in the conference room.

One solution uses a system for processing a video stream received from a camera within a physical space, such as a conference room, to identify multiple people within that video stream. The system may perform object detection looking for humans within input video streams and determine one or more regions of interest within the conference room as the output of that object detection. Each region of interest generally corresponds to one person. The system then separates each person, based on their region of interest, into their own dedicated user interface tile and causes video data for those people to be rendered within their respective user interface tiles within the conferencing software user interface. Individually representing each participant within the conference room has certain benefits, including enabling better communications between remote participants and individual participants within the conference room and enabling better visibility of those participants within the conference room for remote participants.

However, this approach still suffers a drawback in that the people shown in the user interface tiles separated out from an input video stream generally appear in the conferencing software user interface in different sizes based on how far away they are from the camera which captures that video stream. For example, where a single camera is in the front of the conference room, people in the back of the room may substantially appear smaller than people in the front. This is generally because the region of interest separation is being performed against the input video stream and fewer pixels are used within the input video stream to represent people who are farther away from a camera than people who are closer to it. This problem may be compounded based on the shape of the camera lens. Where this problem occurs, a remote user will see people of drastically different sizes within the various user interface tiles. Furthermore, even in cases where processing is performed to normalize sizes of the people within the conference room, quality issues arise from the scaling of video data. In particular, zooming into a region of interest to show someone at the same size as another participant does not result in a change in resolution for the zoomed video content. Rather, the zooming typically will expose quality deficiencies in the resolution at which the video content was originally captured. These varying qualities may be very noticeable within the various user interface tiles. While not necessarily disruptive to the conversation of the meeting, this difference in sizing or resolution quality results in an undesirable quality experience for remote users.

Implementations of this disclosure address problems such as these by normalizing resolutions for video streams output for display within a software user interface. In particular, according to the implementations of this disclosure, resolutions at which a video capture device located within a physical space, for example, a conference room, concurrently captures multiple video streams are normalized based on regions of interest of an initial video stream captured by the video capture device. Each region of interest represents one or more individuals in the conference room. The initial video stream is captured by a camera within the conference room and transmitted to a server, which processes the initial video stream to determine the normalized resolutions to use for capturing the video streams corresponding to the regions of interest. The camera uses instructions received from the server to capture video streams for each of the regions of interest according to the normalized resolutions. Those video streams are then output within the conferencing software user interface. The normalization of the resolutions of the video streams to be output within the separate user interface tiles of the conferencing software user interface improves the quality of the video conferencing software and the user experience thereof by providing a consistent display experience for remote users.

Figure 6:
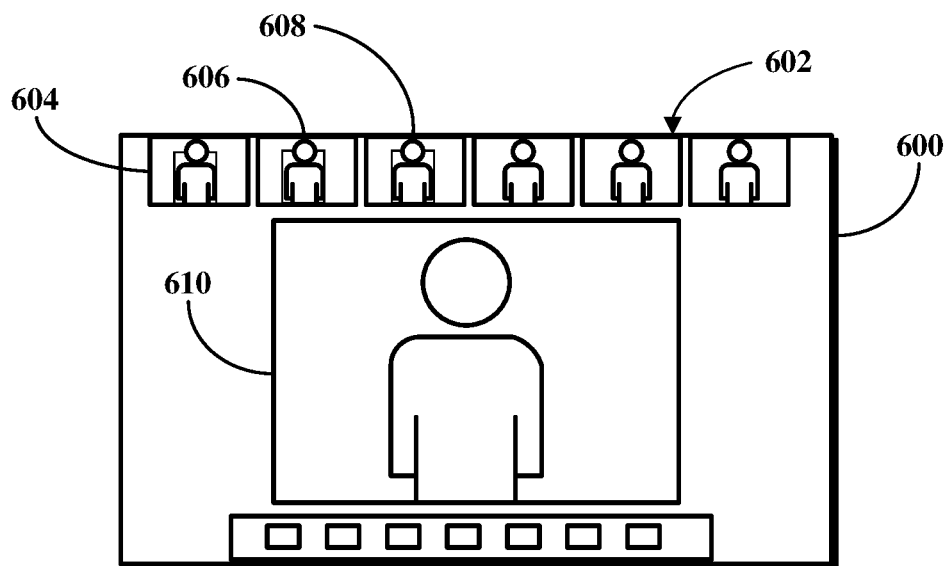
FIG. 6 is an illustration of examples of user interface tiles of a software user interface within which video streams concurrently captured for regions of interest are output.

As used herein, a "user interface tile" refers to a portion of a conferencing software user interface which displays a rendered video showing one or more conference participants. A user interface tile may, but need not, be generally rectangular. The size of a user interface tile may depend on one or more factors including the view style set for the conferencing software user interface at a given time and whether the one or more conference participants represented by the user interface tile are active speakers at a given time. The view style for the conferencing software user interface, which may be uniformly configured for all conference participants by a host of the subject conference or which may be individually configured by each conference participant, may be one of a gallery view in which all user interface tiles are similarly or identically sized and arranged in a generally grid layout or a speaker view in which one or more user interface tiles for active speakers are enlarged and arranged in a center position of the conferencing software user interface while the user interface tiles for other conference participants are reduced in size and arranged near an edge of the conferencing software user interface. Examples of user interface tiles are shown in FIG. 6.

To describe some implementations in greater detail, reference is first made to examples of hardware and software structures used to implement a system for normalizing resolutions for video streams output for display within a software user interface. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over Internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
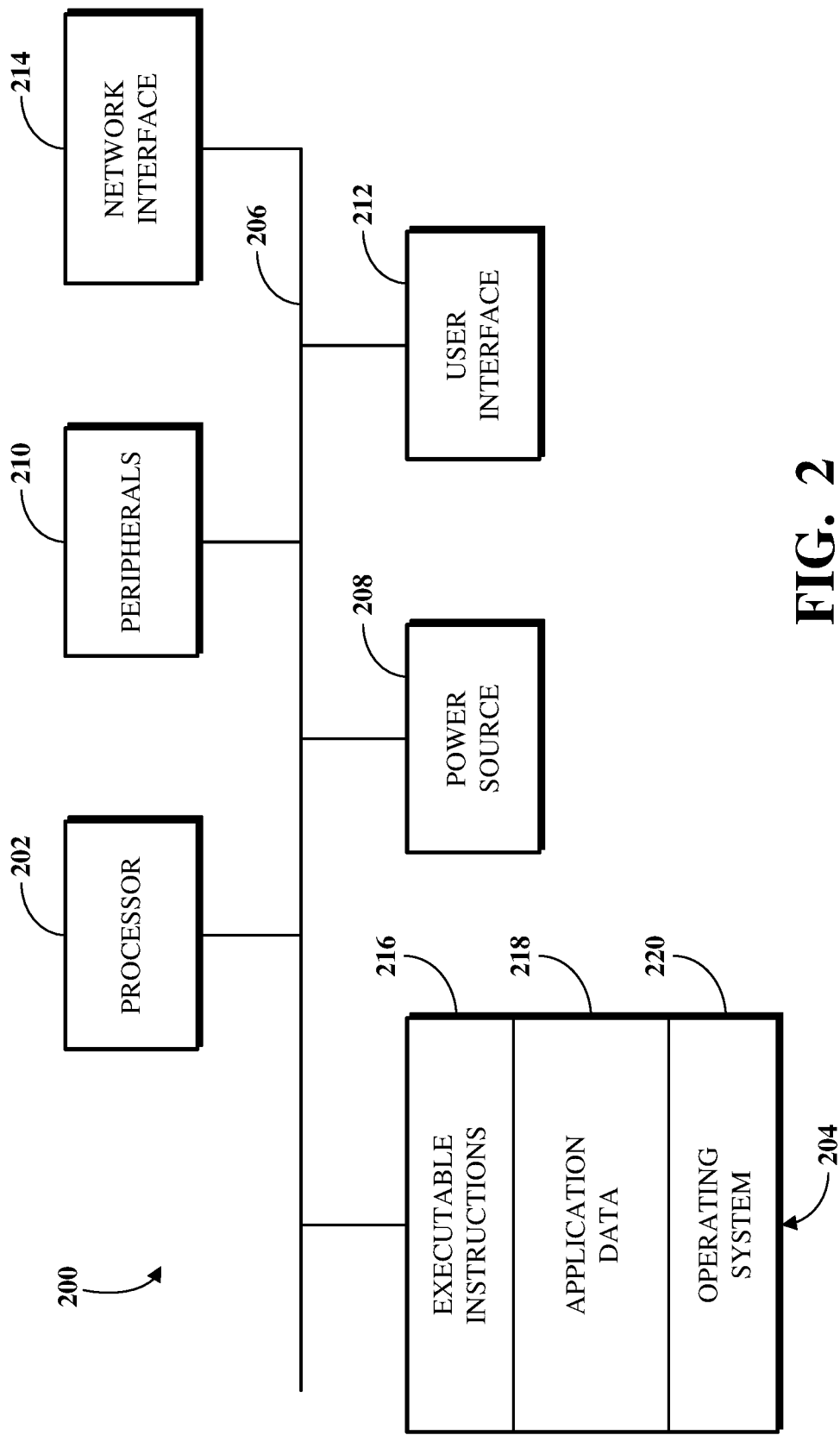
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
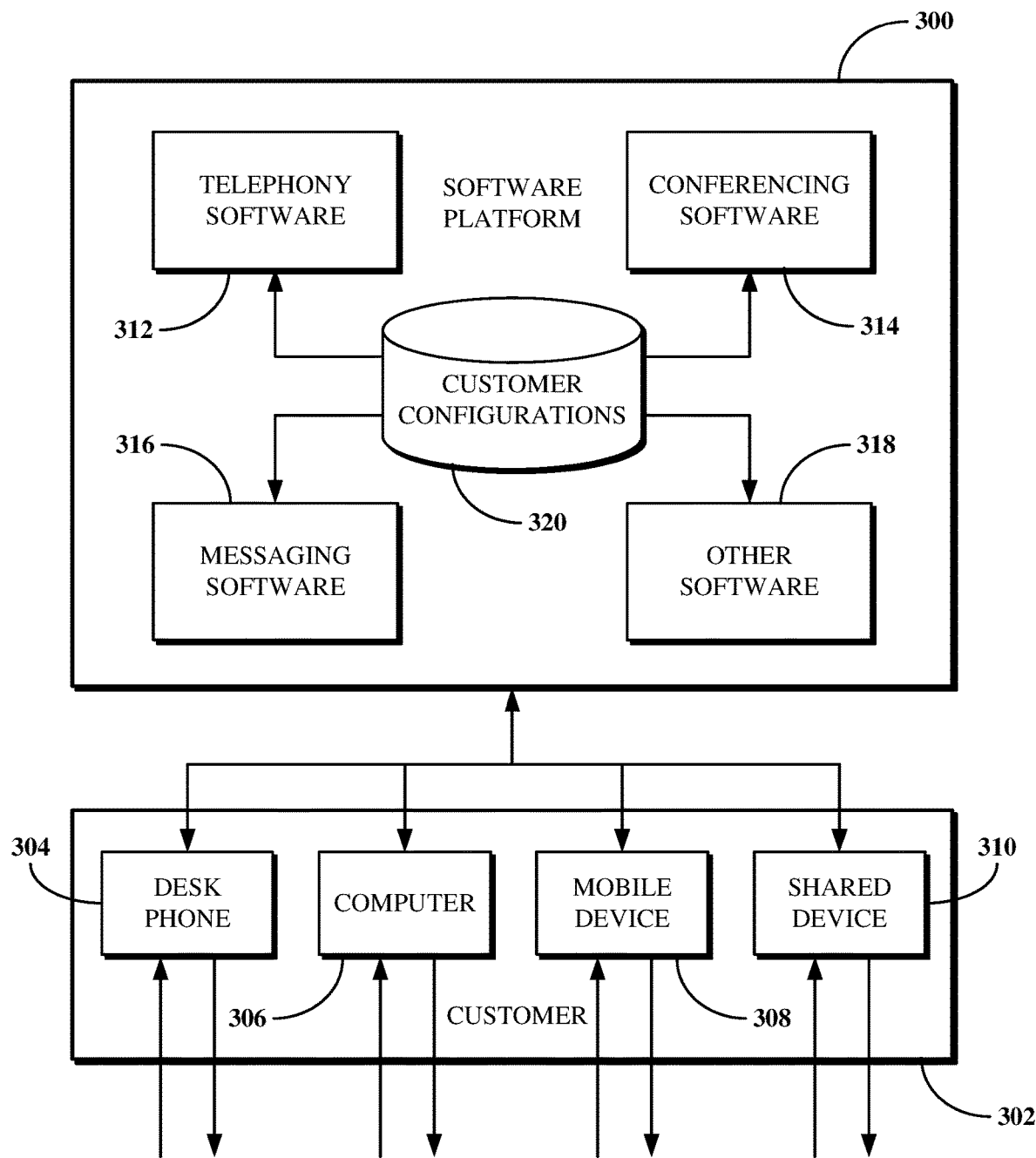
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include software for normalizing resolutions for video streams output for display within a software user interface. In some such implementations, the conferencing software 314 can include the other software 318.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
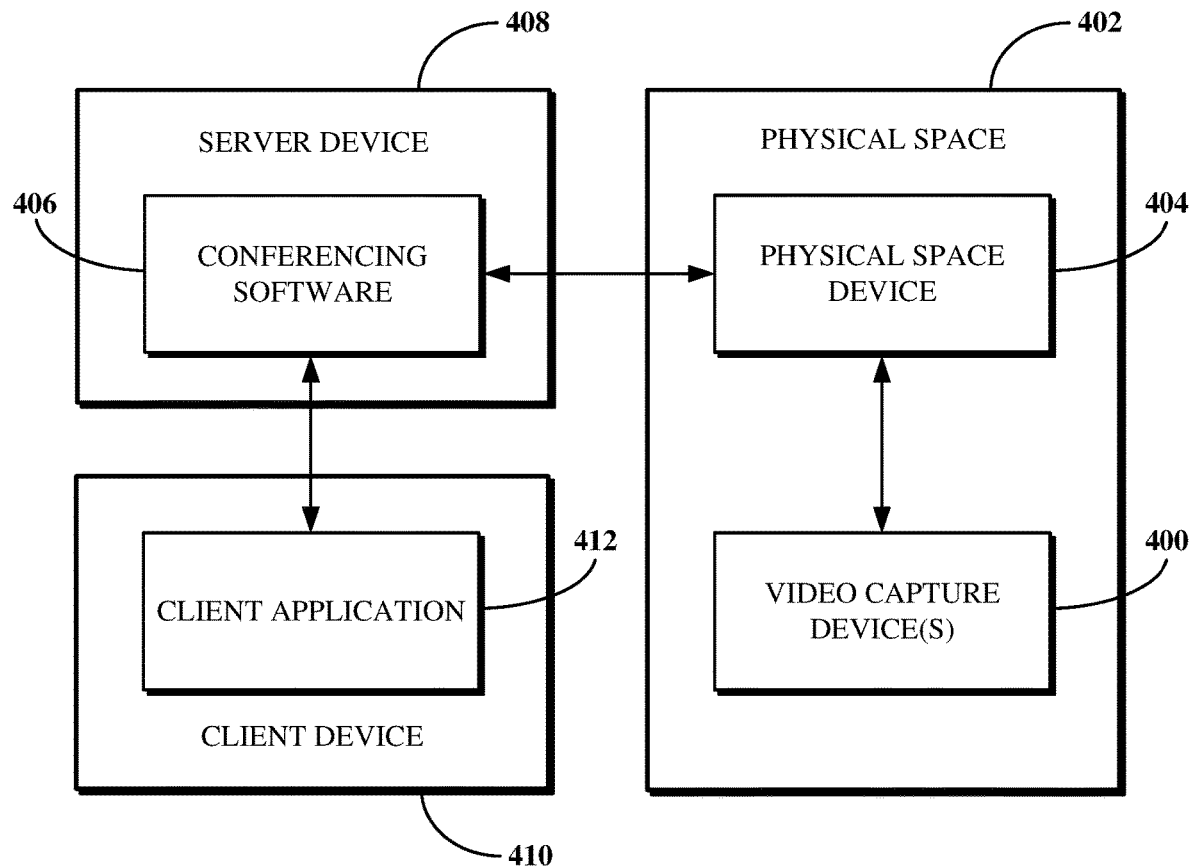
FIG. 4 is a block diagram of an example of a conferencing system.

FIG. 4 is a block diagram of an example of a conferencing system. One or more video capture devices 400 are used to capture video within a physical space 402 in which one or more conference participants are physically located during at least a portion of a conference. For example, the physical space 402 may be a conference room. The one or more video capture devices 400 are cameras configured to record video data within the physical space 402. In one example, a single video capture device 400 may be arranged on a wall of the physical space 402. In another example, a first video capture device 400 may be arranged on a first wall of the physical space 402 and a second video capture device 400 may be arranged on a second wall of the physical space 402 perpendicular to the first wall. However, any number of video capture devices 400 may be arranged on any number of walls of the physical space 402.

Each video capture device 400 has a field of view within the physical space 402 based on an angle and position of the video capture device 400. The video capture devices 400 may be fixed such that their respective fields of view do not change. Alternatively, one or more of the video capture devices 400 may have mechanical or electronic pan, tilt, and/or zoom functionality for narrowing, broadening, or changing the field of view thereof. For example, the pan, tilt, and/or zoom functionality of a video capture device 400 may be electronically controlled, such as by a device operator or by a software intelligence aspect, such as a machine learning model or software which uses a machine learning model for field of view adjustment. A machine learning model as used herein may be or include one or more of a neural network (e.g., a convolutional neural network, recurrent neural network, or other neural network), decision tree, vector machine, Bayesian network, genetic algorithm, deep learning system separate from a neural network, or other machine learning model.

A physical space device 404, which is a computing device associated with the physical space 402, is in communication with a video capture device 400 (e.g., with each of the video capture devices 400). The physical space device 404 thus may be located within the physical space 402. Alternatively, the physical space device 404 may be located external to the physical space 402. For example, the physical space device 404 may be a client device, such as one of the client devices 304 through 310 shown in FIG. 3, which runs a client application which connects to conferencing software 406 at a server device 408. The physical space device 404 runs software configured to process video streams captured by a video capture device 400 for use with a conference. The communication with the video capture device 400 may be over wired (e.g., USB or ethernet) or wireless (e.g., Wi-Fi or Bluetooth) means. In some implementations, the physical space device 404 may include the video capture device 400. For example, rather than be a peripheral connected to the physical space device 404 over wired or wireless means, the video capture device 400 may be integrated within the physical space device 404. In one such example, the video capture device 400 may be a built-in front- or rear-facing camera of the physical space device 404.

The conferencing software 406, which may, for example, be the conferencing software 314 shown in FIG. 3, processes video streams obtained from various devices connected to the conferencing software 406 and transmits the processed video streams to those various devices for output thereat. In particular, video streams transmitted for output from the server device 404 may be rendered within a software user interface at the various devices connected to the conferencing software 406, including, for example, a client device 410. For example, the client device 410 may be a device located remotely from the physical space 402 which runs a client application 412. The client application 412 may receive the video streams from the server 404 and render them for display to a user thereof. The conferencing software 406 thus implements a conference with two or more participants in which one or more of those participants are in the physical space 402 and one or more of those participants are remote participants located external to the physical space 402.

Software running at the physical space device 404 determines normalized resolutions for regions of interest of an initial video stream captured by a video capture device 400 and for instructing the video capture device 400 to capture, at the normalized resolutions, video streams associated with each of the regions of interest. For example, the software may be or otherwise include resolution normalization software. The resolution normalization software may communicate with video stream capture software running at the video capture device 400. For example, the resolution normalization software may obtain an initial video stream and metadata associated with the initial video stream from the video capture device 400, determine normalized resolutions for the regions of interest determined within the initial video stream based on the metadata, and transmit instructions for capturing video streams associated with the regions of interest at the normalized resolutions to the video stream capture software. The video capture device 400 may then use the video stream capture software to capture the video streams associated with the regions of interest according to the normalized resolutions.

In particular, the video streams captured by the video capture device 400 according to the instructions from the software at the physical space device 404 are rendered within a user interface of the conferencing software 406 at one or more devices connected to the conferencing software 406. The video streams are captured at the normalized resolutions according to the instructions from the software at the physical space device 404 so as to cause those video streams to conform sizes and quality levels of the conference participants associated therewith within separate user interface tiles of the user interface. Thus, each of the conference participants for whom a video stream is captured according to those instructions will appear with the same or a similar quality and size to remote participants connecting to the conferencing software 406 over remote devices, such as the client device 410.

The client application 412 is software which communicates with the conferencing software 406 to enable the user of the client device 410 to participate in the conference implemented using the conferencing software 406 as a remote participant. The client device 410 may, for example, be one of the clients 304 through 310. The client device 410 includes one or more capture components, such as a camera, which capture input (e.g., video data) that is then transmitted to the conferencing software 406 for presentation to connected devices within or otherwise through a user interface of the conferencing software 406. For example, an input video stream from the client device 410 may be processed and output within a user interface tile for the user of the client device 410 within the user interface of the conferencing software 406.

Each of the separate user interface tiles at which video streams captured according to normalized resolutions are rendered represents one or more of the conference participants within the physical space 402. In some cases, where a field of view of a video capture device 400 includes only one conference participant, a stream of video data from that video capture device 400 can be rendered within a user interface tile for that conference participant. In other cases, where a field of view of a video capture device 400 includes multiple conference participants, a stream of video data from that video capture device can be processed to determine regions of interest corresponding to those conference participants within the physical space 402 based on that video data. For example, multiple regions of interest can be determined within a field of view of a video capture device 400 and video streams for rendering individual ones of those regions of interest within separate user interface tiles of the conferencing software 406 may accordingly be captured. The client application 412, upon receiving the video streams, renders the video streams within the respective user interface tiles for viewing at the client device 410.

A region of interest generally refers to an area in which a conference participant is visible within video data. A region of interest within the physical space 402 can be determined based on video data from the video capture devices 400 in one or more ways. In one example, a region of interest can be determined by processing an input video stream obtained from a video capture device 400 to detect a number of people, as conference participants, within the field of view of the video capture device 400, as well as the locations of those conference participants within the physical space 402. A machine learning model trained for object detection, facial recognition, or other segmentation can process the video data of the input video stream to identify humans. For example, the machine learning model can draw bounding boxes around objects detected as having human faces, in which those objects are recognized as the conference participants and remaining video data is representative of background content. One or more regions of interest determined from an input video stream from a single video capture device 400 may then be separately rendered in their own user interface tiles within the conferencing software 406. In another example, a region of interest can be determined by obtaining data indicative of the region of interest from the video capture device 400. For example, the video stream capture software running at the video capture device 400 can process the initial video stream captured using the video capture device 400 to determine the region of interest.

In some implementations, audio data captured within the physical space 402 may be used to determine the regions of interest to be represented within output video streams to render in user interface tiles of the conference software 406. For example, the audio data may be captured using one or more audio capture devices (e.g., microphones) within the physical space 402. The audio data may be processed to determine the directions from which the audio data arrives at the audio capture devices. For example, a machine learning model trained for voice activity detection or a similar tool can process the audio data to detect when the audio data includes human vocal sounds, such as from a person talking. Upon detecting voice activity within the audio data, a machine learning model trained for direction of arrival processing or a similar tool can process the audio data to determine directions of arrival indicating where the voice activity is coming from within the physical space 402. The directions of arrival may then be used to determine a conversational context within the physical space 402, and, more specifically, within a subject field of view of a video capture device 400 determined based on video data from the video capture device 400. The conversational context may, for example, correspond to a context and/or length of a conversation between two or more conference participants within the physical space 402. A region of interest within the subject field of view to feature within a user interface tile of the conferencing software 406 may then be based on the video data and the determined conversational context.

In some cases, multiple regions of interest may be determined for a single conference participant. For example, a conference participant may be included within the fields of view of two or more different video capture devices 400. In such a case, those multiple regions of interest may be treated as candidate regions of interest for the conference participant and evaluated to select one for use in an output video stream for rendering within a user interface tile representing the conference participant. The candidate regions of interest may be evaluated using a machine learning model trained for facial recognition such as by scoring detections of a face of the subject conference participant within each of the candidate regions of interest according to one or more factors. Examples of the factors may include, but are not limited to, a size of the face of the conference participant, a percentage of the face of the conference participant which is visible (e.g., due to the conference participant facing one video capture device 400 and not another or due to differences in lighting captured by the video capture devices 400), and the presence of other conference participants within a threshold distance of the face of the conference participant. A candidate region of interest having the highest score may be selected and used for processing and rendering within a user interface tile representing the conference participant.

In some implementations, the software for determining the normalized resolutions for the regions of interest and for transmitting instructions to the one or more video capture devices 400 may be at the server device 408 instead of at the physical space device 404. In some such implementations, the conferencing software 406 can include that software. In some implementations, the software for determining the normalized resolutions for the regions of interest and for transmitting instructions to the one or more video capture devices 400 may be at a server other than the server device 408. In some such implementations, the servers may be in communication with one another during the conference. Accordingly, the implementations of this disclosure may operate the software for determining the normalized resolutions for the regions of interest and for transmitting instructions to the one or more video capture devices 400 at the server-side or at the client-side. For example, a client-side implementation may process information to be sent to the conferencing software 406 at the physical space device 404, such as before it is sent to the conferencing software 406, and it may further process information received from the conferencing software 406 before that information is rendered using a client application running the physical space device 404. In another example, a server-side implementation may process information obtained from the one or more video capture devices 400 directly or indirectly (e.g., via the physical space device 404 as an intermediary) at the server device 408 and transmit instructions from the server device 408 directly or indirectly to the one or more video capture devices.

Figure 5:
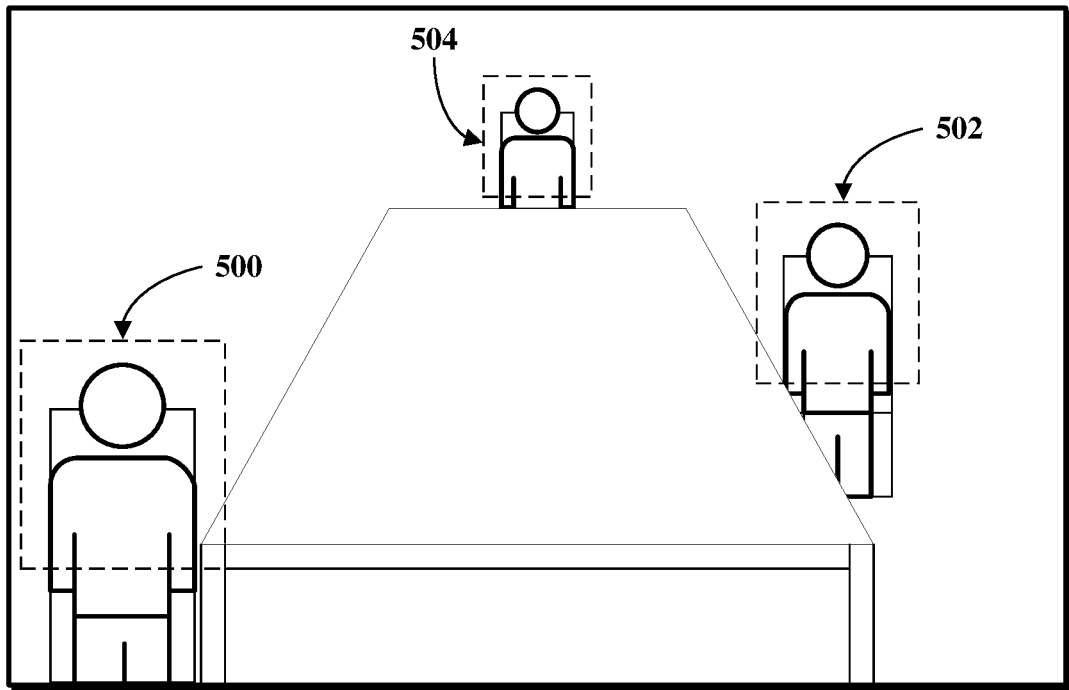
FIG. 5 is an illustration of an example of regions of interest of an initial video stream.

FIG. 5 is an illustration of an example of regions of interest of an initial video stream. Three conference participants are shown as being within a physical space, for example, the physical space 402 shown in FIG. 4. In the example shown, the three conference participants are located at different places around a conference room table and are facing a video capture device used to capture the initial video stream (e.g., one of the one or more video capture devices 400 shown in FIG. 4). For example, a front wall of the physical space which the three conference participants are facing may include the video capture device and a display at which a user interface of conferencing software (e.g., the conferencing software 406 shown in FIG. 4) is output. The initial video stream may be processed to determine three regions of interest 500, 502, and 504, in which the region of interest 500 corresponds to a first conference participant located closest to the video capture device near the front wall of the physical space, the region of interest 502 corresponds to a second conference participant located approximately halfway between the video capture device and a rear wall of the physical space, and the region of interest 504 corresponds to a third conference participant located farthest from the video capture device near the rear wall of the physical space.

The three conference participants appear as different sizes within the input video stream based on their proximity to the video capture device. As such, the first conference participant appears as a largest size, the second conference participant appears as an intermediate size, and the third conference participant appears as a smallest size. Accordingly, a size of the region of interest 500 (e.g., a number of pixels representing it within a given video frame of the initial video stream) is larger than a size of the region of interest 502, and a size of the region of interest 502 is similarly larger than a size of the region of interest 504. Without resolution normalization processing, video streams captured for each of the regions of interest 500 through 504 would cause the three conference participants to appear either as noticeably different sizes or at noticeably different quality levels within user interface tiles of the conferencing software. This difference in size or quality level may make it difficult to see the third conference participant, who would appear as the smallest of the three, and could ultimately cause some disruption or quality concerns with respect to the conference. However, using instructions for capturing the video streams of each of the regions of interest 500 through 504 at normalized resolutions, the three conference participants would appear to be the same or a similar size and quality level within their separate user interface tiles of the conferencing software.

FIG. 6 is an illustration of examples of user interface tiles of a software user interface 600 within which video streams concurrently captured for regions of interest are output. For example, the software user interface 600 may be a user interface of conferencing software, such as the conferencing software 406 shown in FIG. 4. The software user interface includes user interface tiles 602 associated with conference participants, in which some are remote conference participants and others are conference participants located within a physical space, such as the physical space 402 shown in FIG. 4. In particular, the user interface tiles 602 include a first user interface tile 604 at which a video stream captured for a first conference participant (e.g., the first conference participant associated with the region of interest 500 shown in FIG. 5) is output, a second user interface tile 606 at which a video stream captured for a second conference participant (e.g., the second conference participant associated with the region of interest 502 shown in FIG. 5) is output, and a third user interface tile 608 at which a video stream captured for a third conference participant (e.g., the third conference participant associated with the region of interest 504 shown in FIG. 5) is output. A large user interface tile 610 represents an active speaker at a given time during the conference.

The user interface tiles 604 through 608 represent conference participants within a physical space. In particular, the video streams output within the user interface tiles 604 through 608 are captured at normalized resolutions determined for the regions of interest represented by the user interface tiles 604 through 608. Referring to the example in which the user interface tiles 604 through 608 respectively correspond to the first, second, and third conference participants referenced above in the discussion of FIG. 5, and despite those three conference participants appearing as noticeably different sizes in the initial video stream of FIG. 5, the video streams captured for the three conference participants according to the normalized resolutions conform their sizes and quality levels within the separate user interface tiles 604 through 608.

Figure 7:
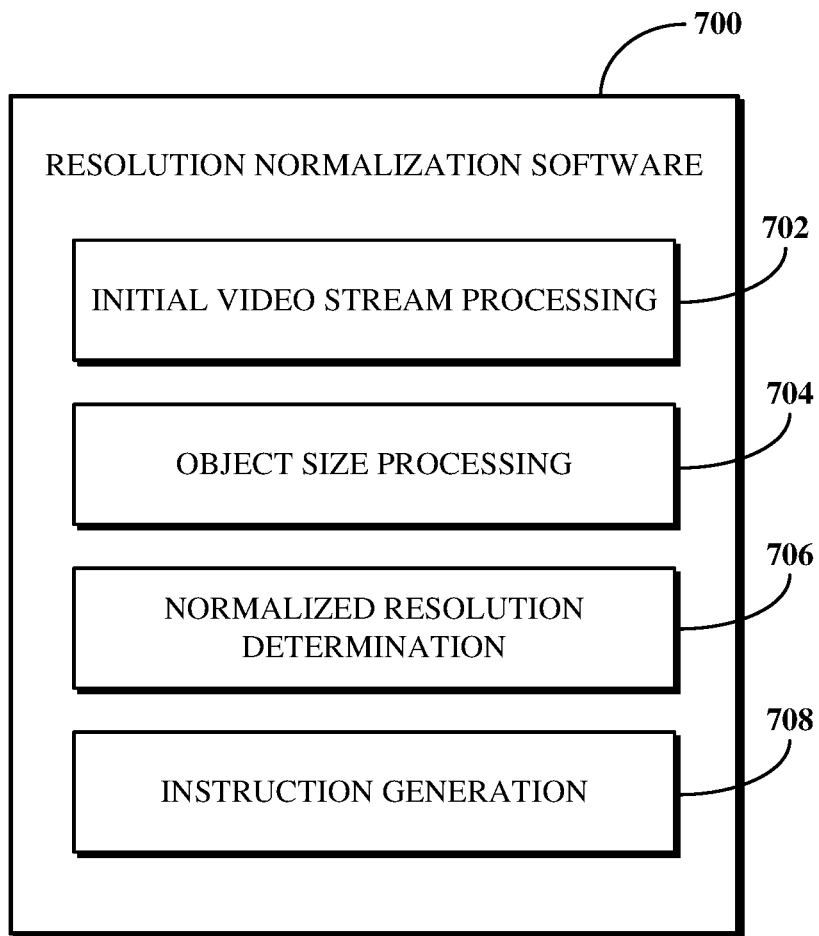
FIG. 7 is a block diagram of an example functionality of resolution normalization software.

FIG. 7 is a block diagram of an example functionality of resolution normalization software 700. The resolution normalization software 700 includes tools, such as programs, subprograms, functions, routines, subroutines, operations, and/or the like for determining normalized resolutions at which to capture video streams based on regions of interest determined within a physical space, for example, the physical space 402 shown in FIG. 4. As shown, the resolution normalization software 700 includes an initial video stream processing tool 702, an object size processing tool 704, a normalized resolution determination tool 706, and an instruction generation tool 708.

In some implementations, the resolution normalization software 700 may be run at a client, for example, the physical space device 404 or the client device 410 shown in FIG. 4. In some such implementations, the resolution normalization software 700 may include or be included in a client application, for example, the client application 412 or a client application running on the physical space device 404. In some implementations, the resolution normalization software 700 may be run at a server, for example, the server device 404 shown in FIG. 4. In some such implementations, the resolution normalization software 700 may include or be included in conferencing software, for example, the conferencing software 406 shown in FIG. 4.

The initial video stream processing tool 702 processes an initial video stream obtained from a video capture device located within a physical space, for example, the video capture device 400 shown in FIG. 4. Processing the initial video stream includes determining regions of interest of the initial video stream. The initial video stream processing tool 702 may determine the regions of interest by performing object detection against one or more video frames of the initial video stream. For example, the initial video stream processing tool 702 may use a machine learning model trained for object detection to detect objects (e.g., partial or whole human faces) within the initial video stream. In some cases, the machine learning model may scale down a resolution of the initial video stream (e.g., to 360×240) for the object detection processing or use a scaled down copy of the initial video stream therefor, given that object detection typically does not require high amounts of detail. Each area within the initial video stream at which an object is detected may be determined as a region of interest. The location of each detected region of interest (e.g., expressed in a two-dimensional pixel coordinate format) may be recorded for later use.

Alternatively, the initial video stream processing tool 702 may determine the regions of interest based on metadata obtained from the video capture device which captured the initial video stream. For example, video stream capture software at the video capture device may perform object detection against the initial video stream, such as described above using an object detection model or otherwise, and generate the metadata based on results of the object detection. The metadata may specify locations of objects of potential relevance (e.g., expressed in a two-dimensional pixel coordinate format) within the initial video stream. For example, the initial video stream processing tool 702 may determine the regions of interest based on the metadata by processing the metadata against the initial video stream so as to verify that the objects correspond to conference participants. Alternatively, the metadata may specifically indicate regions of interest and locations thereof within the initial video stream. For example, the initial video stream processing tool 702 may determine the regions of interest based on the metadata by indicating the regions of interest specified by the metadata without verification.

The object size processing tool 704 determines sizes of the objects at the regions of interest within the initial video stream at the resolution captured by the video capture device. In particular, the object size processing tool 704 determines the sizes of those objects to determine relationships between the sizes of those objects. A size of an object may be expressed in two-dimensions in units of pixels. For example, the size of an object may be determined based on a generally rectangular region of interest which corresponds to that object. In some cases, the region of interest may be a bounding box encompassing the object. For example, the bounding box may enclose the object without margins, such as in which outer-most pixels of the objects are on or adjacent to perimeters of the bounding box. In another example, the bounding box may enclose the object with a defined margin of scalable or non-scalable size based on the size of the bounding box. The object size processing tool 704 determines the sizes of the objects and then the relationships between the sizes of those objects to understand which objects are smaller or larger than others. In some implementations, the size of an object at a region of interest may be indicated within the metadata obtained from the video capture device.

The normalized resolution determination tool 706 determines the normalized resolutions at which to capture individual video streams for each of the regions of interest. The normalized resolutions are generally different from resolutions of the initial video stream from which the subject regions of interest were detected. Generally, the normalized resolutions determined for a given region of interest may be the same as or higher than the resolution at which the video content of the region of interest was captured within the initial video stream. Thus, determining the normalized resolutions may include increasing the resolution of portions of the initial video stream corresponding to each of the regions of interest. In particular, the amount by which the resolution of a portion of the initial video stream corresponding to a given region of interest is to increase may be based on the size of the detected object (e.g., the conference participant) within that region of interest. This helps to ensure that, when video stream captured according to the normalized resolutions are later output for rendering within separate user interface tiles of conferencing software, the resulting sizes and quality levels of the conference participants within those separate user tiles conform to one another. For example, where there are two regions of interest determined within the initial video stream in which one corresponds to a first conference participant near the video capture device within the physical space and one corresponds to a second conference participant farther from the video capture device within the physical space, determining the normalized resolutions can include increasing the resolution for the region of interest of the first conference participant by a first amount and increasing the resolution for the region of interest of the second conference participant by a second amount which is greater than the first amount. As a result of the increases by the first amount and the second amount, the sizes of the first conference participant and of the second conference participant and the quality levels of the video streams representing those conference participants will be identical or within a threshold range of each other. A threshold range as used herein, such as a size range threshold or a quality range threshold, is not bound to specific values but rather may refer to a range of applicable values within which sizes or quality levels of conference participants are perceptibly the same or perceptibly similar. As such, two sizes or two quality levels do not need to be identical to fall within a threshold range.

Determining the normalized resolutions includes scaling (e.g., zooming into) each region of interest to cause the participants to be of the same or similar sizes, according to the output of the object size processing tool 704, and then determining resolutions at which to capture the video streams for the regions of interest based on differences in quality resulting from the scaling. The differences in quality maybe measured using one or more image quality metrics, for example, peak signal to noise ratio, structural similarity index measure, multiscale structural similarity index measure, visual information quality, or contrast sensitivity. In particular, determining the normalized resolutions can include determining resolutions at which video content of each region of interest matches or is within a threshold range according to one or more image quality metrics.

In an example use case, the initial video stream may be captured at 1920×1080 resolution. The region of interest for a first conference participant who is closest to the video capture device may not need to be scaled since that participant already appears the largest within the initial video stream. Where a second conference participant is farther away from the video capture device within the physical space, the region of interest for that participant may need to be scaled to increase the size of that participant to conform with a size of the first conference participant. However, doing so will cause the video content for the region of interest of the second conference participant to drop below 1920×1080 resolution, and in some cases by a highly perceptible amount. The normalized resolutions may thus be determined based on these circumstances. For example, the normalized resolutions may include a first normalized resolution determined for the region of interest of the first conference participant (e.g., at the original 1920×1080 resolution) and a second normalized resolution determined for the region of interest of the second conference participant at an increased resolution (e.g., 2560×1440). In another example, the normalized resolution determined for the region of interest of the first conference participant may represent an increase over the resolution of the initial video stream and the normalized resolution determined for the region of interest of the second conference participant may represent an even larger increase over the resolution of the initial video stream.

Thus, in some cases, determining the normalized resolutions may include increasing the resolution of some portions of the initial video stream (e.g., one or more first regions of interest) and decreasing the resolution of other portions thereof (e.g., one or more second regions of interest). In particular, and again to help to ensure that the resulting sizes and quality levels of the conference participants within the separate user tiles conform to one another, the amount by which the resolution of a portion of the initial video stream corresponding to a given region of interest is to increase or decrease may be based on the size of the detected object (i.e., the person) within that region of interest or the scaling of that region of interest based on the size of the detected object. For example, where there are two regions of interest detected in which one corresponds to a first conference participant near the video capture device within the physical space and one corresponds to a second conference participant farther from the video capture device within the physical space, scaling the regions of interest for determining the normalized resolutions can include scaling the region of interest of the first conference participant down (e.g., zooming out from that region of interest) and decreasing the resolution for the region of interest of the first conference participant to cause the first conference participant to appear at a first size and scaling the region of interest of the second conference participant up (e.g., zooming into that region of interest) and increasing the resolution for the region of interest of the second conference participant to cause the second conference participant to appear at a second size in which the first size and the second size are either identical or within a threshold range of each other and the quality for each of the video streams to be captured, according to the respective scaling, is also identical to or within a threshold range of each other.

In some implementations, the normalized resolutions may be determined based on at least one of a room condition associated with the physical space, a network condition associated with the physical space, or a device constraint associated with the physical space. For example, bandwidth limitations may affect processing by the video capture device and/or a computing device running the resolution normalization software 700 (e.g., a physical space device or a server device). The bandwidth limitations may indicate that, even if the normalized resolutions can be determined at a first resolution (e.g., 1920×1080), a second, lower resolution (e.g., 1280×720) may be preferable, such as to avoid lag, latency, jitter, or similar issues. In another example, device constraints may specify a maximum possible resolution available to the video capture device (e.g., based on a megapixel constraint for image sensors thereof), such that normalized resolutions may be limited by the maximum possible resolution. In yet another example, the processing of the initial video stream may indicate one or more lighting conditions within the physical space, which constrains a maximum resolution for the normalized resolutions (e.g., based on empirical modeling).

In some implementations, the normalized resolutions can be determined using distance modeling for locations around the physical space at which the regions of interest are determined. For example, the server can empirically build or receive as input an understanding of distances between locations of specific seats in the physical space and the video capture device location in the physical space. Because the regions of interest are likely to be for conference participants sitting in at least some of those seats, the known distances between the seats at which conference participants are detected to calculate the amount by which the resolution for that subject region of interest of the initial video stream will need to be scaled.

The instruction generation tool 708 generates instructions that, when processed by the video capture device, cause the video capture device to capture the individual video streams for each of the regions of interest at the normalized resolutions. The instructions, while referred to as instructions, may be or otherwise include one or more of instructions, commands, data, and/or other information which can be processed to cause the video capture device which receives the instructions to capture the video streams at the normalized resolutions. The instructions are generated based on the normalized resolutions determined by the normalized resolution determination tool 706.

Although the tools 702 through 708 are shown as functionality of the resolution normalization software 700 as a single piece of software, in some implementations, some or all of the tools 702 through 708 may exist outside of the resolution normalization software 700 and/or the software platform may exclude the resolution normalization software 700 while still including the some or all of tools 702 through 708 in some form elsewhere. For example, some or all of the tools 702 through 708 may be implemented by conferencing software, such as the conferencing software 406 shown in FIG. 4.

In some implementations, the resolution normalization software 700 may include other tools in addition to or in place of one or more of the tools 702 through 708. In some implementations, the resolution normalization software 700 may include a video capture device detection tool that detects when a new video capture device is deployed for use within the physical space that includes the video capture device from which the initial video stream is obtained. For example, a new video capture device may be deployed for use within the physical space at some point during a conference after normalized resolutions have been determined based on an initial video stream, as disclosed above. In such a case, the video data, and optionally metadata, obtained from that new video capture device may be processed to determine whether, and if so by how much, to adjust the normalized resolutions. For example, a conference participant, whether in the physical space or remote, may express dissatisfaction with the angles that the existing video capture device have or with how far those cameras are from some of the people within the conference room, such as based on renderings of video streams for one or more of the conference participants within the physical space based on the instructions generated by the instruction generation tool 708. In some cases, the new video capture device may have capture settings which are similar to or otherwise capable of matching those of the existing video capture devices. For example, a determination may be made that the new video capture device is capable of outputting a maximum resolution which is the same as or higher than the previously-determined normalized resolutions. In such a case, the normalized resolutions may not be adjusted. However, where the new video capture device is capable of outputting a maximum resolution which is lower than the normalized resolutions, the normalized resolution determination tool 706 may update the normalized resolutions for the regions of interest so as to cause all of the video streams captured for those regions of interest from all of the relevant video capture devices, including the new video capture device, to be captured at the same resolution for a consistent remote user experience.

In some implementations, the resolution normalization software 700 may include a conference participant movement detection tool that detects movements of conference participants associated with the regions of interest processed by the resolution normalization software 700. For example, a video stream captured (e.g., according to the normalized resolutions) can be processed to determine when a given conference participant within the physical space is leaning or moving in a way which interferes with the conformed sizes and quality levels of the conference participants based on the normalized resolutions. In some cases, a message indicative of such determination may be output for display to the given conference participant. For example, where a conference participant within physical space is swiveling his or her chair or rocking back and forth in his or her chair in a way that causes the size and quality level of the conference participant to materially change within the video stream captured for his or her region of interest, a message may be output to indicate that the frequent movement is reducing remote user quality and to recommend that the subject participant please refrain from or limit such movement. In at least some cases, participant identity can be determined based on an object recognition evaluation performed for each of the regions of interest. For example, facial details observed within a region of interest can be compared against a company database. In some implementations, the message output for display may be rendered within the software user interface which includes the user interface tiles for the conference participants. In some implementations, the message can be transmitted to a secondary device of the given conference participant, such as based on a registration of that secondary device with or other connection of that secondary device to the conferencing software.

In some implementations, the resolution normalization software 700 may include a seating recommendation tool that recommends seats within the physical space that includes the video capture device at which participants should or should not sit to improve the region of interest processing by the resolution normalization software 700. For example, knowledge of video capture device fields of view (e.g., camera angles) and distances between seats and the video capture device within the physical space may be used to determine when a conference participant is sitting in a seat which is not optimal for video capture. In such a case, a message suggesting that the conference participant move seats may be output for display, such as by the message being rendered within the software user interface which includes the user interface tiles for the conference participants or transmitted to a secondary device of the given conference participant. For example, indicative of participant visibility within a video stream may be calculated at different locations around the physical space over time, and regions of interest detected at locations with scores lower than a threshold score value may be monitored.

In some implementations, the resolution normalization software 700 may include a light normalization tool that normalizes lighting across the video streams captured for the regions of interest based on differences in how lighting within the physical space affects those individual video streams. For example, lighting differences may result from the separation of regions of interest from the initial video stream and/or from the scaling of video streams to normalize the sizes of the participants within the video streams. In some cases, normalizing the lighting across the video streams may include sampling lighting values from one of the video streams and applying corrections to the other video streams to cause lighting values thereof to match or otherwise become perceptibly similar to the samples. In some cases, normalizing the lighting across the video streams may include determining a normalized lighting value based on lighting values sampled from some or all of the video streams and then applying corrections to all of the video streams according to the determined normalized lighting value. In any such case, a light value may be, include, or otherwise refer to at least one of an exposure value, a brightness value, a contrast value, an ISO level value, or another lighting-related value. In some implementations, the light values may be determined and the application of corrections may be performed after the video streams are captured according to the instructions transmitted to the video capture device. For example, the light values may be determined and the application of corrections may be performed prior to transmitting the video streams for output within the conferencing software user interface. In some implementations, the light values may be determined and the application of corrections may be performed as part of the process for generating the instructions to transmit to the video capture device. For example, processing may be performed against the video contact of the regions of interest within the initial video stream to determine how to adjust lighting values when capturing the video streams for the regions of interest, and the instructions may accordingly be generated to indicate such adjustments.

Figure 8:
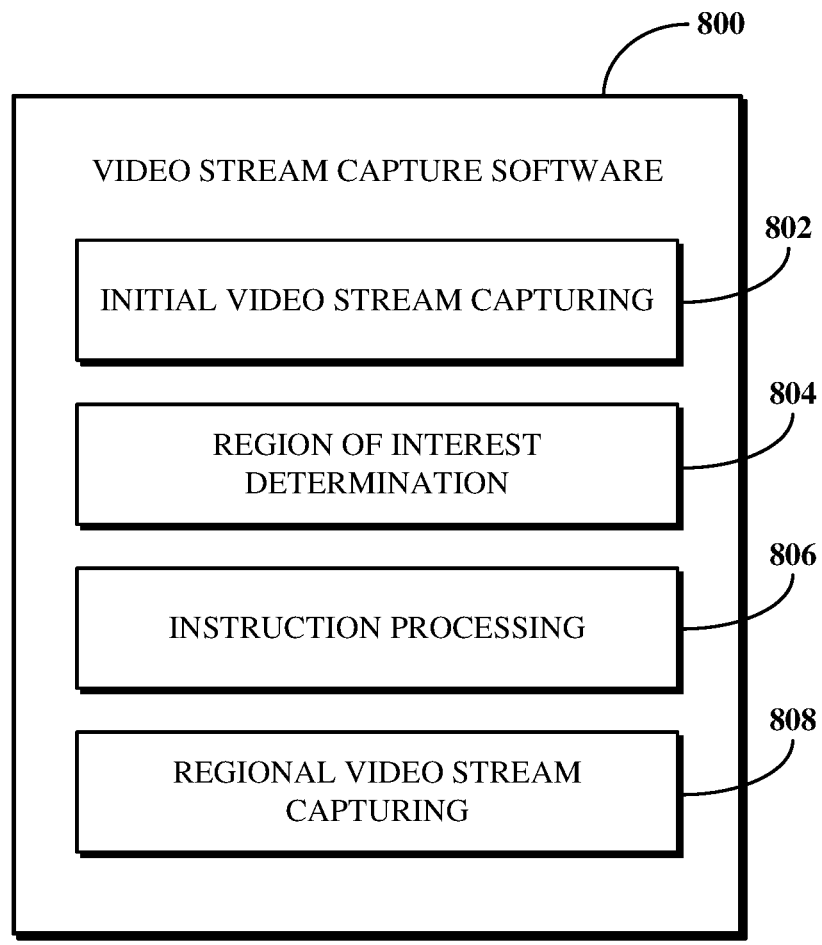
FIG. 8 is a block diagram of an example functionality of video stream capture software.

FIG. 8 is a block diagram of an example functionality of video stream capture software 800. The video stream capture software 800 includes tools, such as programs, subprograms, functions, routines, subroutines, operations, and/or the like for capturing video streams within a physical space, for example, the physical space 402 shown in FIG. 4. As shown, the video stream capture software 800 includes an initial video stream capturing tool 802, a region of interest determination tool 804, an instruction processing tool 806, and a regional video stream capturing tool 808. The video stream capture software 800 may be run at a video capture device within the physical space, for example, a video capture device 400 as shown in FIG. 4.

The initial video stream capturing tool 802 captures an initial video stream representing conference participants within the physical space. The capture of the initial video stream may be initiated based on a connection to conferencing software of a physical space device which uses the video capture device running the video stream capture software 800. For example, the physical space device may use the video capture device for video purposes when connecting to a conference implemented by the conferencing software, such as the conferencing software 406 shown in FIG. 4. In some cases, the initial video stream may be captured while the physical space device connects to the conferencing software, such as during a start up process for establishing the connection between a client application running at the physical space device and the conferencing software. In some cases, the initial video stream may be captured after the connection between the physical space device and the conferencing software is established, such as at a beginning or otherwise during a conference implemented by the conferencing software.

The region of interest determination tool 804 transmits data indicative of regions of interest of the initial video stream to a computing device to which the video capture device is connected (e.g., the physical space device). For example, the data may be metadata. The data may be generated based on some processing of the initial video stream. In some cases, the region of interest determination tool 804 may determine the regions of interest of the initial video stream based on object detection performed against the initial video stream. For example, the region of interest determination tool 804, itself or using a machine learning model available to the region of interest determination tool 804, may perform object detection against the initial video stream to determine the regions of interest thereof. The region of interest determination tool 804 may then generate the metadata indicative of the regions of interest based on the output of that object detection performance. Examples and implementations for performing object detection as disclosed above with respect to the resolution normalization software 700 shown in FIG. 7 may also be performed by the region of interest determination tool 804, and thus at the video capture device. Alternatively, the data, rather than indicating the regions of interest directly, may indicate locations of relevant objects detected within the initial video stream. In such a case, the transmitted data may be configured for use by software running other than at the video capture device (e.g., the resolution normalization software 700) to determine the regions of interest at such other device.

The instruction processing tool 806 processes instructions obtained from a computing device to which the data indicative of the regions of interest of the initial video stream were transmitted. The instructions are or otherwise include one or more of instructions, commands, data, and/or other information which can be processed to cause the video capture device to capture individual video streams for each of the regions of interest determined within the initial video streams at normalized resolutions determined based on those regions of interest. Processing the instructions includes initiating or otherwise configuring one or more video capture pipelines of the video capture device for video stream capture at the normalized resolutions based on the number of regions of interest for which to capture video streams. In particular, the video capture device may have multiple, concurrently running video capture pipelines. Each of the video capture pipelines uses the same or a different sensor to capture video streams and a different processor or processor thread to handle the capture and processing. The instructions may thus be processed to cause the video capture device to use a separate image capture pipeline to capture a separate video stream for each of the regions of interest.

The regional video stream capturing tool 808 captures video streams for the regions of interest at the normalized resolutions according to the instructions. For example, where there are two regions of interested determined within the initial video stream, the instructions may cause the video capture device to capture a first video stream corresponding to the first region of interest and a second video stream corresponding to the second region of interest. Capturing a video stream according to the instructions may include causing the video capture device (e.g., using a video capture pipeline initiated or otherwise configured by the instruction processing tool 806) to zoom into a portion of video frames of the initial video stream corresponding to a region of interest until the resulting data is at the normalized resolution. As such, while the camera may not physically move, the instructions according to which the video streams are captured cause the video capture device to concurrently capture different video streams at different portions of the physical space.

Although the tools 802 through 808 are shown as functionality of the video stream capture software 800 as a single piece of software, in some implementations, some or all of the tools 802 through 808 may exist outside of the video stream capture software 800 and/or a video capture device performing the functionality of the video stream capture software 800 may exclude the video stream capture software 800 while still including the some or all of tools 802 through 808 in some form elsewhere.

Figure 9:
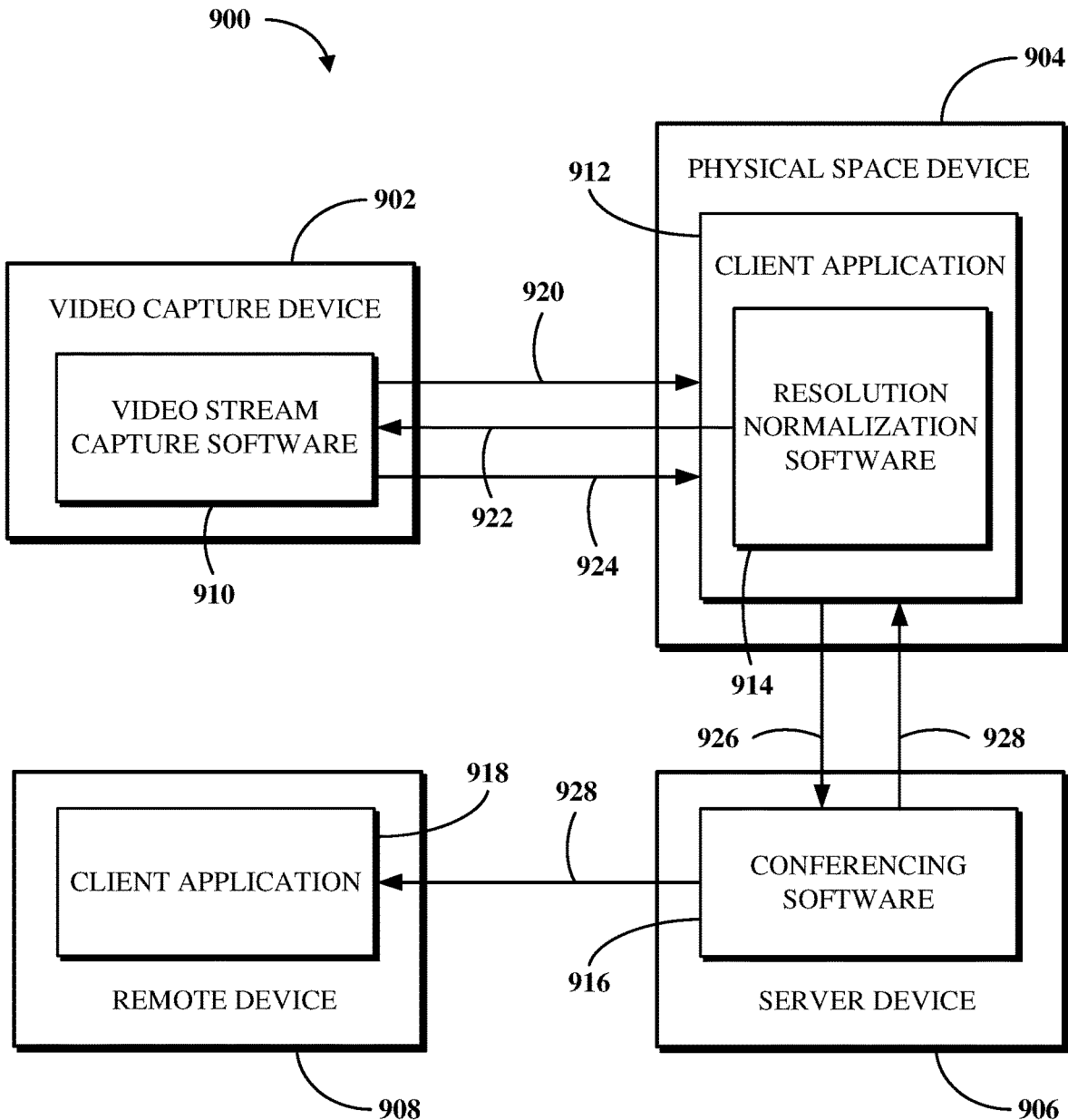
FIG. 9 is a block diagram of an example of a system for region of interest-based resolution normalization and concurrent region of interest-based video stream capture at normalized resolutions.

FIG. 9 is a block diagram of an example of a system 900 for region of interest-based resolution normalization and concurrent region of interest-based video stream capture at normalized resolutions. The system 900 includes a video capture device 902, a physical space device 904, a server device 906, and a remote device 908, which may, for example, respectively be the video capture device 400, the physical space device 404, the server device 408, and the client device 410 shown in FIG. 4. The video capture device 902 runs video stream capture software 910, which may, for example, be the video stream capture software 800 shown in FIG. 8. The physical space device 902 runs a client application 912 which includes resolution normalization software 914, which may, for example, be the resolution normalization software 700 shown in FIG. 7. The server device 906 runs conferencing software 916, which may, for example, be the conferencing software 406 shown in FIG. 4. The remote device 908 runs a client application 918, which may, for example, be the client application 412 shown in FIG. 4. The client application 912 and the client application 918 may represent separate instances and/or versions of the same client software, for example, client software for accessing one or more services of a software platform, such as the software platform 300 shown in FIG. 3.

The video stream capture software 910 is used to capture an initial video stream 920 (optionally accompanied by metadata), which is transmitted to the client application 912. The resolution normalization software 914 determines normalized resolutions for regions of interest of the initial video stream 920 and transmits instructions 922 for capturing video streams for those regions of interest at the normalized resolutions. The video stream capture software 910 captures those video streams 924 according to the instructions 922 and transmits the video streams 924 to the client application 912. The client application 912 processes the video streams to prepare them for transmission to the conferencing software 916 and thereafter transmits the processed video streams 926 to the conferencing software 916. The conferencing software 916 further processes the processed video streams 926 to prepare them as output for rendering within separate user interface tiles of a user interface of the conferencing software 916. The conferencing software 916 the outputs the video streams 928 for rendering to the client application 912 and to the client application 918.

Figure 10:
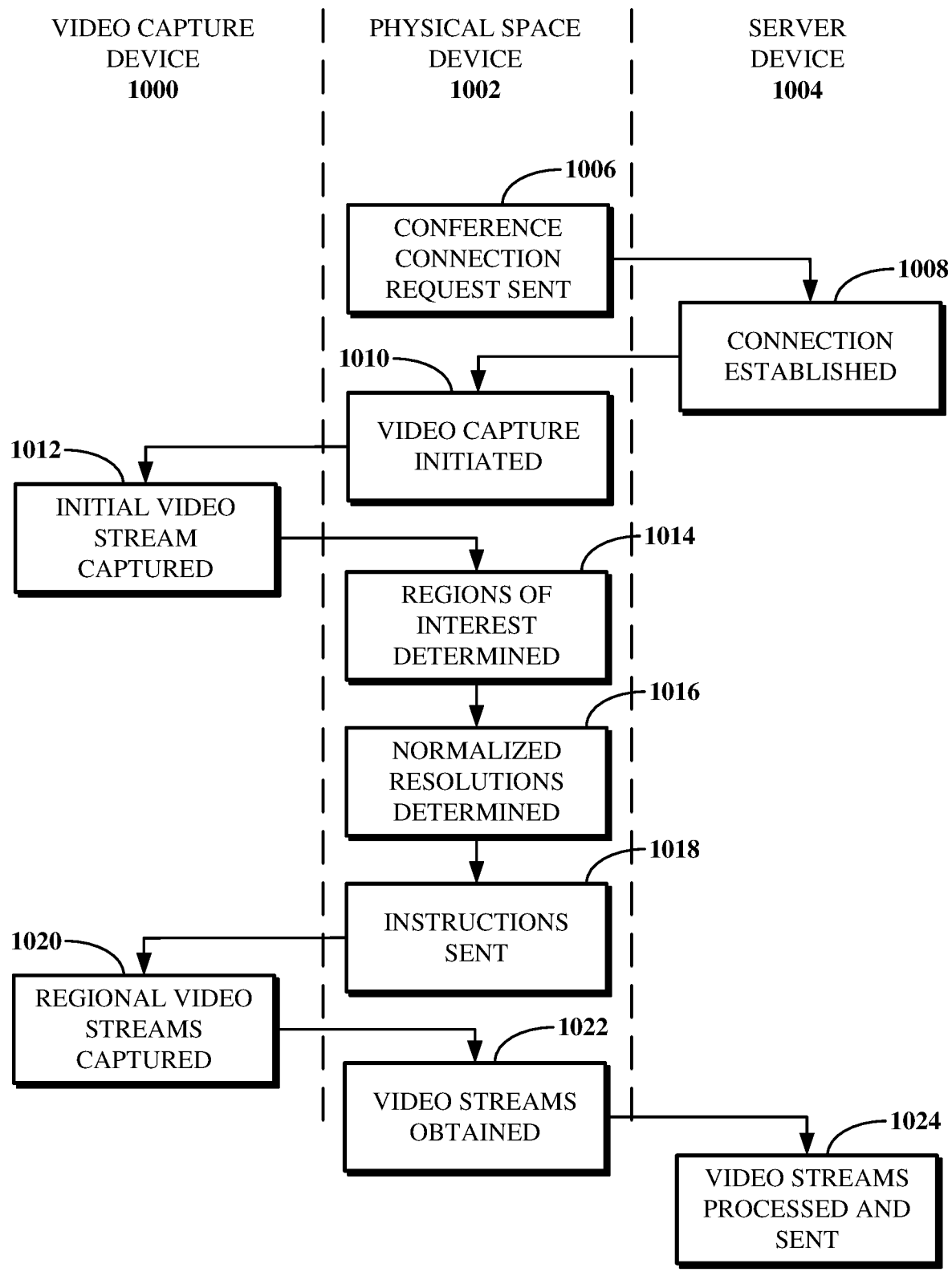
FIG. 10 is an illustration of swim lanes showing an example sequence of operations performed for region of interest-based resolution normalization and concurrent region of interest-based video stream capture at normalized resolutions.

FIG. 10 is an illustration of swim lanes showing an example sequence of operations performed for region of interest-based resolution normalization and concurrent region of interest-based video stream capture at normalized resolutions. In particular, the sequence of operations is between a video capture device 1000, a physical space device, 1002, and a server device 1004, which may, for example, respectively be the video capture device 902, the physical space device 904, and the server device 906 shown in FIG. 9. As such, the sequence of operations may represent operations performed by the system 900 shown in FIG. 9.

At 1006, a conference connection request is sent from the physical space device 1002 to the server device 1004, in particular, from a client application running at the physical space device 1002 to conferencing software running at the server device 1004. For example, the conference connection request may be sent in response to a user of the physical space device 1002 starting a conference or clicking a link to join a conference from the physical space device 1002. At 1008, the connection is established between the physical space device 1002 and the server device 1004 based on the conference connection request. At 1010, video capture is initiated at the physical space device 1002. At 1012, responsive to the initiation of the video capture, an initial video stream is captured by the video capture device 1000. At 1014, regions of interest of the initial video stream are determined at the physical space device 1002. At 1016, normalized resolutions are determined for the regions of interest. At 1018, instructions for capturing video streams, at the normalized resolutions, are transmitted to the video capture device 1000. At 1020, the video streams for the regions of interest are captured by the video capture device 1000 at the normalized resolutions according to the instructions transmitted from the physical space device 1002. At 1022, the video streams captured according to the instructions are obtained by the physical space device 1002. At 1024, those video streams are transmitted to the server device 1004, where they are processed and sent out for rendering at connected devices.

Figure 11:
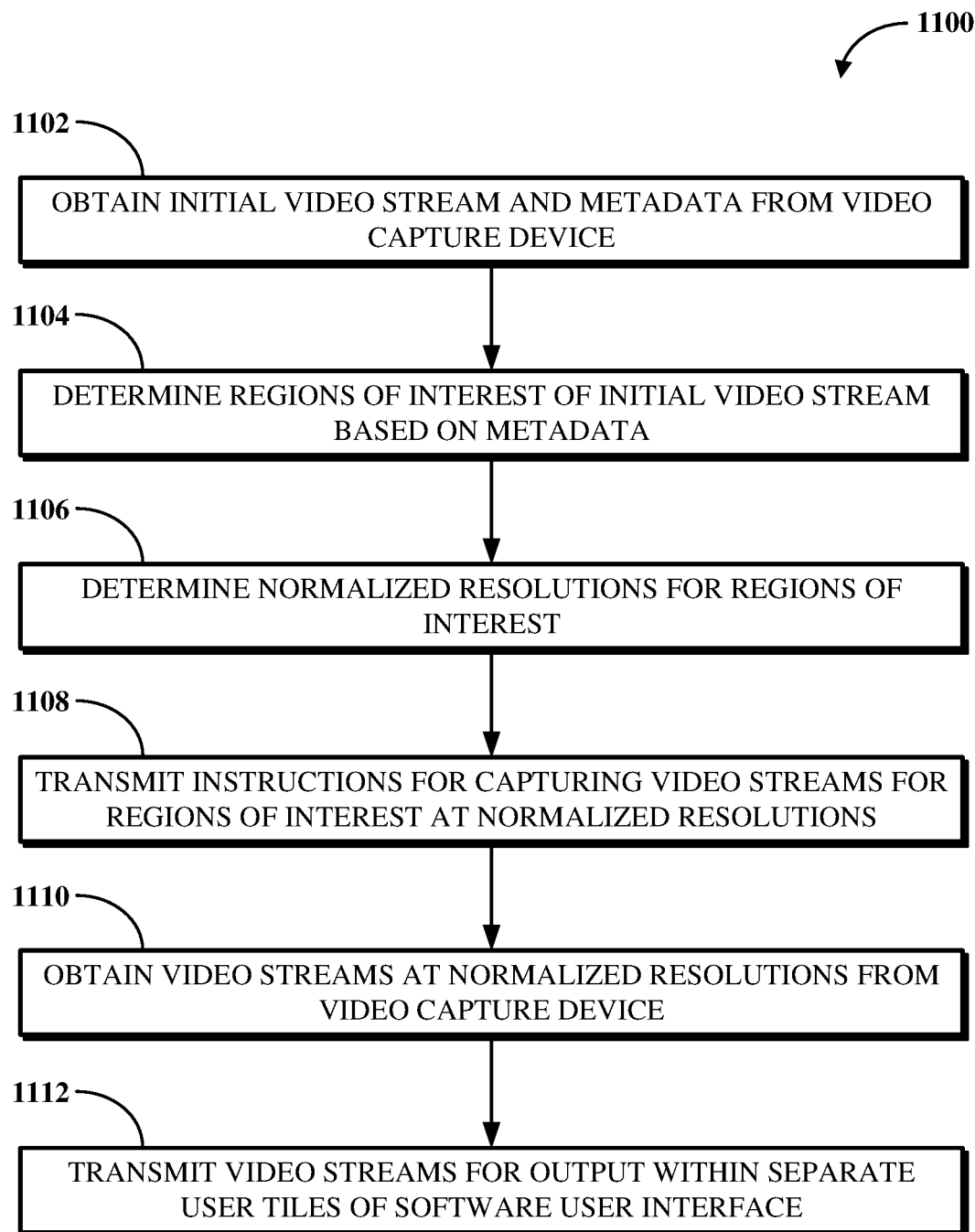
FIG. 11 is a flowchart of an example of a technique for region of interest-based resolution normalization.
Figure 12:
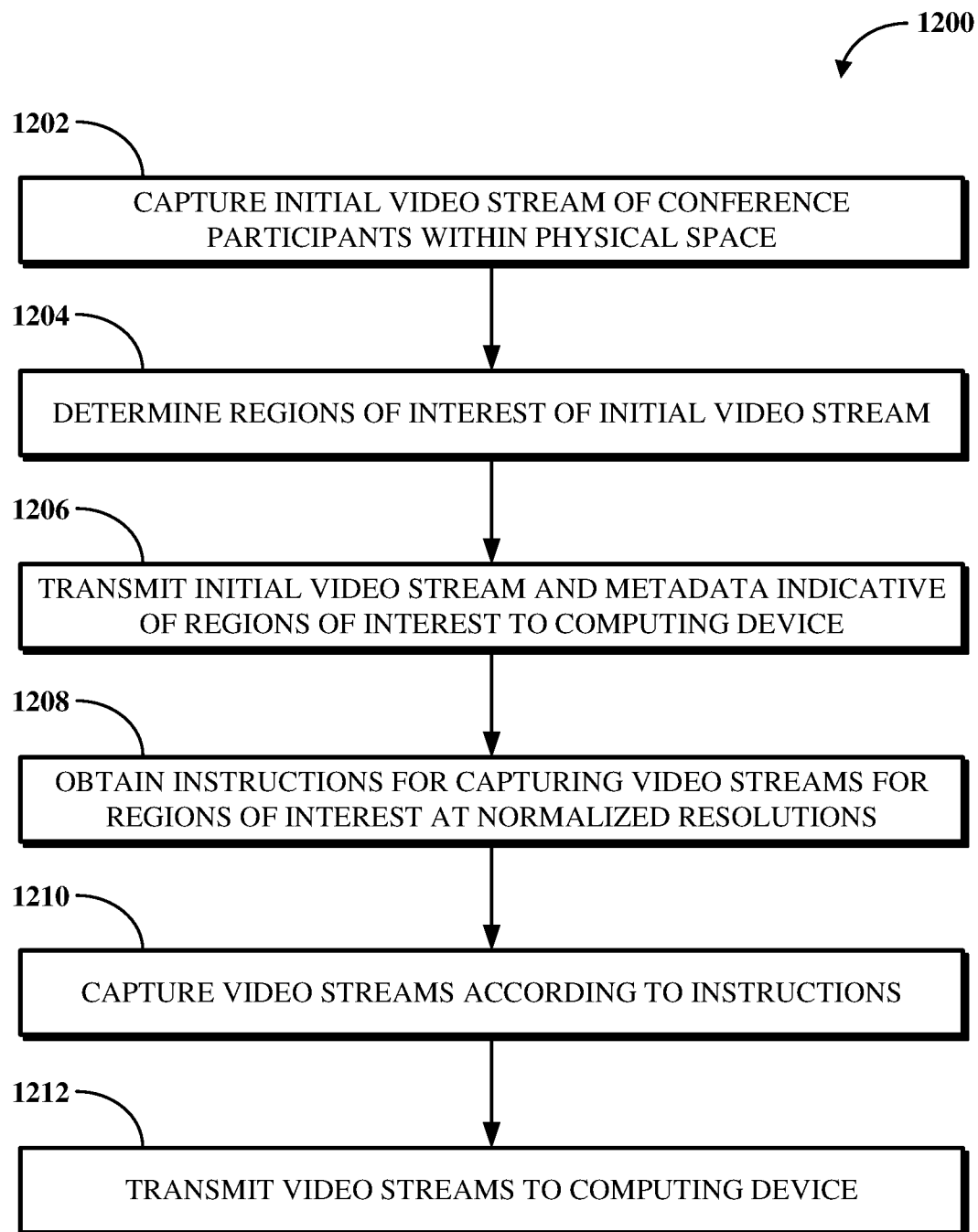
FIG. 12 is a flowchart of an example of a technique for concurrent region of interest-based video stream capture at normalized resolutions.

To further describe some implementations in greater detail, reference is next made to examples of techniques which may be performed by or using a system for normalizing resolutions for video streams output for display within a software user interface. FIG. 11 is a flowchart of an example of a technique 1100 for region of interest-based resolution normalization. FIG. 12 is a flowchart of an example of a technique 1200 for concurrent region of interest-based video stream capture at normalized resolutions.

The technique 1100 and/or the technique 1200 can be executed using computing devices, such as the systems, hardware, and software described with respect to FIGS. 1-10. The technique 1100 and/or the technique 1200 can be performed, for example, by executing a machine-readable program or other computer-executable instructions, such as routines, instructions, programs, or other code. The steps, or operations, of the technique 1100 and/or the technique 1200 or another technique, method, process, or algorithm described in connection with the implementations disclosed herein can be implemented directly in hardware, firmware, software executed by hardware, circuitry, or a combination thereof.

For simplicity of explanation, the technique 1100 and the technique 1200 are each depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

Referring first to FIG. 11, the technique 1100 for region of interest-based resolution normalization is shown. At 1102, an initial video stream, and optionally metadata, are obtained from a video capture device located within a physical space, such as a conference room. The initial video stream is captured based on a physical space device associated with the physical space requesting to connect to conferencing software running at a server device. For example, the initial video stream may be captured responsive to a connection established between a client application running at the physical space device and the conferencing software.

At 1104, regions of interest are determined within the initial video stream based on the metadata obtained from the video capture device. In one example, first and second regions of interest may be determined within the initial video stream. The first region of interest may be associated with a first conference participant within the physical space and the second region of interest may be associated with a second conference participant within the physical space. Determining the first and second regions of interest may include using data indicative of the first and second regions of interest, such as the metadata, from the video capture device in which that data indicative of the first and second regions of interest are processed to determine the first and second regions of interest. Alternatively, determining the first and second regions of interest may include processing the initial video stream to detect the first region of interest and the second region of interest.

In some implementations, determining the regions of interest may include evaluating initial video streams obtained from multiple video capture devices within the physical space. For example, candidate regions of interest within the initial video streams obtained from the multiple video capture devices within the physical space may be evaluated to determine to use at least one of the first region of interest or the second region of interest, such as based on those first and second regions of interest being the best representations of the first and second conference participants to which they correspond out of the candidate regions of interest.

At 1106, normalized resolutions are determined for the regions of interest. The normalized resolutions are determined based on sizes of objects (e.g., the conference participants) associated with the regions of interest. For example, where the first conference participant is located closer to the video capture device than the second conference participant, determining the normalized resolutions may include scaling (e.g., zooming into) a portion of the initial video stream corresponding to the first region of interest by a first amount and increasing a resolution of that portion by a first amount to cause the first conference participant to appear at a first size and a first quality level within a first user interface tile of the user interface tiles, and scaling (e.g., zooming into) a portion of the initial video stream corresponding to the second region of interest by a second amount and increasing a resolution of that portion by a second amount to cause the second conference participant to appear at a second size and a second quality level within a second user interface tile of the user interface tiles, wherein the second amount is greater than the first amount, and wherein the amounts by which video stream portions are scaled and the amounts by which resolutions for those video stream portions are adjusted may correspond to one another or be independent of one another. In another example, where the first conference participant is located closer to the video capture device than the second conference participant, determining the normalized resolutions may include scaling (e.g., zooming out from) a portion of the initial video stream corresponding to the first region of interest and decreasing a resolution of that portion to cause the first conference participant to appear at a first size and a first quality level within a first user interface tile of the user interface tiles, and scaling (e.g., zooming into) a portion of the initial video stream corresponding to the second region of interest increasing a resolution of that portion to cause the second conference participant to appear at a second size and a second quality level within a second user interface tile of the user interface tiles, wherein the first size and the second size are within a size range of each other and the first quality level and the second quality level are within a quality range of each other.

In some implementations, the normalized resolutions are based on a first distance between the first conference participant and the video capture device within the physical space and a second distance between the second conference participant and the video capture device within the physical space. For example, determining the normalized resolutions may include determining a first distance between the first conference participant and the video capture device within the physical space, determining a second distance between the second conference participant and the video capture device within the physical space, and determining the normalized resolutions based on a relationship between the first distance and the second distance.

In some implementations, the normalized resolutions are higher than a resolution of the initial video stream. For example, the initial video stream may be captured at 852× 480 pixels, but network availability and video capture device capabilities may allow for a higher quality video stream to be captured for the regions of interest at 1280×720 pixels or 1920×1080 pixels. In some such implementations, information about the network availability and/or the video capture device capabilities may either already be accessible or may be obtained for the purposes of determining the normalized resolutions.

In some implementations, where there are multiple (e.g., two) video capture devices within the physical space, the normalized resolutions may be constrained based on a maximum resolution of a second video capture device within the physical space. In some implementations, the normalized resolutions are determined based on at least one of a room condition associated with the physical space, a network condition associated with the physical space, or a device constraint associated with the physical space.

At 1108, instructions for capturing video streams for the regions of interest at the normalized resolutions are transmitted to the video capture device. The instructions are generated based on the normalized resolutions. The instructions are configured to cause the video capture device which receives them to capture video streams at the normalized resolutions for specified regions of interest, such as the first and second regions of interest used herein by example.

At 1110, video streams captured for the regions of interest at the normalized resolutions are obtained from the video capture device. In the example of the first and second regions of interest, the video streams include a first video stream associated with the first region of interest and a second video stream associated with the second region of interest. The first and second video streams are captured at the normalized resolutions so as to conform sizes and quality levels of the first and second conference participants within separate user interface tiles of a conferencing software user interface to which the first and second video streams are output.

At 1112, the video streams are transmitted to a server device for output within separate user interface tiles of a software user interface. The server device runs the conferencing software to which the physical space device and one or more remote devices are connected. A user interface of the conferencing software is output at each of those devices. The video streams captured according to the instructions are rendered, based on output from the server device to each such device, within the separate user interface tiles. As disclosed above, the representations of the first and second conference participants within their respective user interface tiles appear to be the same size and quality level despite those conference participants being at different locations within the physical space and thus initially being of different sizes within the initial video stream.

In some implementations, the technique 1100 may include updating the normalized resolutions based on a detection of a new (e.g., a second or subsequent) video capture device within the physical space. For example, a new video capture device may be deployed within the physical space during the conference based on user feedback indicating low quality camera angles or other poor quality of the video capture device already being used for the video stream capture within the physical space. In some such implementations, the further capture of the first video stream and the second video stream according to the updated normalized resolutions may be based on a maximum resolution of the new video capture device within the physical space.

In some implementations, the technique 1100 may include detecting movements of conference participants and outputting messages addressing those movements. For example, responsive to detecting a movement of the first conference participant affecting the conformance of the sizes and/or quality levels of the first and second conference participants within the separate user interface tiles, a message recommending that the first conference participant cease the movement may be output, such as to the physical space device or another device.

Referring next to FIG. 12, the technique 1200 for concurrent region of interest-based video stream capture at normalized resolutions is shown. At 1202, an initial video stream of conference participants, for example, first and second conference participants, within a physical space is captured by a video capture device. The capturing of the initial video stream may be based on a conference connection request from a physical space device in communication with the video capture device. The initial video stream may, for example, be captured at a default or defined resolution for the video capture device.

At 1204, regions of interest of the initial video stream are determined based on the initial video stream. Determining the regions of interest may include performing object detection against the initial video stream, for example, using a machine learning model at or otherwise available to the video capture device. For example, the object detection may be performed to detect human faces representing conference participants within the physical space. Metadata indicative of output of the region of interest determination may be generated. In some implementations, the initial video stream or a copy thereof may be scaled down to a lower resolution for the object detection performance. In an example, the region of interest determination may be performed to determine a first region of interest associated with a first conference participant within the physical space and a second region of interest associated with a second conference participant within the physical space.

At 1206, data indicative of the determined regions of interest is transmitted from the video capture device to a computing device. For example, the computing device may be a physical space device located within the physical space. In another example, the computing device may be a server device running conferencing software. The data indicative of the determined regions of interest includes the initial video stream, and optionally the metadata indicative of the regions of interest. Where first and second regions of interest are determined, the data is indicative of those first and second regions of interest.

At 1208, instructions for capturing video streams for the regions of interest at normalized resolutions are obtained. The data indicative of the determined regions of interest is usable by the computing device to determine normalized resolutions for the regions of interest and to generate the instructions for capturing video streams for those regions of interest at the normalized resolutions. The normalized resolutions are resolutions at which to capture video streams for individual regions of interest determined within the initial video stream so as to cause sizes and quality levels of the conference participants within those regions of interest to conform within separate user interface tiles of a software user interface. The normalized resolutions may in at least some cases be higher than a resolution of the initial video stream. For example, the instructions may indicate to increase a resolution of a portion of the initial video stream corresponding to the first region of interest by a first amount to cause the first conference participant to appear at a first size and a first quality level within a first user tile of the user tiles and to increase a resolution of a portion of the initial video stream corresponding to the second region of interest by a second amount to cause the second conference participant to appear at a second size and a second quality level within a second user tile of the user tiles, wherein the second amount is greater than the first amount. In another example, the instructions may indicate to decrease a resolution of a portion of the initial video stream corresponding to the first region of interest to cause the first conference participant to appear at a first size and a first quality level within a first user tile of the user tiles and to increase a resolution of a portion of the initial video stream corresponding to the second region of interest to cause the second conference participant to appear at a second size and a second quality level within a second user tile of the user tiles, wherein the first size and the second size are within a threshold size range of each other and the first quality level and the second quality level are within a threshold quality range of each other. In some implementations, the normalized resolutions are constrained by a maximum capture resolution of the video capture device. In some implementations, the instructions received from the computing device indicate to constrain the capture of the first video stream and the second video stream based on a maximum resolution of a second video capture device within the physical space.

At 1210, the video streams are captured for the regions of interest at the normalized resolutions. The video streams are captured at the normalized resolutions according to the instructions received from the computing device. Capturing the video streams can include opening, based on the instructions received from the computing device, processing threads at the video capture device to capture the video streams. For example, where the instructions are to capture a first video stream for a first region of interest and a second video stream for a second region of interest, first and second processing threads may be opened at the video capture device, in which the first video stream is captured using the first processing thread and the second video stream is captured using the second processing thread. In some implementations, the instructions, when processed, may cause a first video capture pipeline to, using a first processor thread, use an image sensor to capture the first video stream and cause a second video capture pipeline to, using a second processor thread, use the image sensor to capture the second video stream. In some implementations, the instructions, when processed, may cause a first video capture pipeline to use a first image sensor to capture the first video stream and cause a second video capture pipeline to use a second image sensor to capture the second video stream.

At 1212, the video streams are transmitted to a computing device. In particular, the video streams are transmitted for output within separate user interface tiles of a conferencing software user interface. Per the instructions obtained from the computing device, the video streams conform sizes and quality levels of the conference participants corresponding to the regions of interest within separate user interface tiles of a software user interface, for example, a user interface of conferencing software implementing the conference of which the conference participants are participants. For example, where first and second video streams are captured according to the instructions received from the computing device, the first and second video streams may conform a size and quality level of the first conference participant within a first user interface tile of the user interface tiles and a size and quality level of the second conference participant within a second user interface tile of the user interface tiles. In some implementations, transmitting the video streams may thus include transmitting the first and second video streams to the physical space device to configure the physical space device to transmit the first and second video streams to a server device running conferencing software which includes the conferencing software user interface.

In some implementations, transmissions from the video capture device are at a frame-level. In some implementations, transmissions from the video capture device are at a chunk-level. For example, one or more of the initial video stream, data indicative of the regions of interest (to the extent different from the initial video stream), or the video streams captured according to the instructions may be transmitted to the computing device for processing, output, or the like at the frame-level, meaning on a video frame basis, or at the chunk-level, meaning on a chunk on N consecutive video frames basis, in which N is an integer greater than or equal to 2.

The implementations of this disclosure correspond to methods, non-transitory computer readable media, apparatuses, systems, devices, and the like. In some implementations, a method comprises determining normalized resolutions for first and second regions of interest of an initial video stream captured by a video capture device located within a physical space, wherein the first region of interest is associated with a first conference participant within the physical space and the second region of interest is associated with a second conference participant within the physical space; and instructing the video capture device to capture, at the normalized resolutions, a first video stream associated with the first region of interest and a second video stream associated with the second region of interest, wherein the first and second video streams conform sizes and quality levels of the first and second conference participants within separate user interface tiles of a conferencing software user interface to which the first and second video streams are output. In some implementations, a non-transitory computer readable medium stores instructions operable to cause one or more processors to perform operations comprising determining normalized resolutions for first and second regions of interest of an initial video stream captured by a video capture device located within a physical space, wherein the first region of interest is associated with a first conference participant within the physical space and the second region of interest is associated with a second conference participant within the physical space; and instructing the video capture device to capture, at the normalized resolutions, a first video stream associated with the first region of interest and a second video stream associated with the second region of interest, wherein the first and second video streams conform sizes and quality levels of the first and second conference participants within separate user interface tiles of a conferencing software user interface to which the first and second video streams are output. In some implementations, an apparatus comprises a memory and a processor configured to execute instructions stored in the memory to determine normalized resolutions for first and second regions of interest of an initial video stream captured by a video capture device located within a physical space, wherein the first region of interest is associated with a first conference participant within the physical space and the second region of interest is associated with a second conference participant within the physical space; and instruct the video capture device to capture, at the normalized resolutions, a first video stream associated with the first region of interest and a second video stream associated with the second region of interest, wherein the first and second video streams conform sizes and quality levels of the first and second conference participants within separate user interface tiles of a conferencing software user interface to which the first and second video streams are output.

In some implementations of the method, non-transitory computer readable medium, or apparatus, the first conference participant is located closer to the video capture device than the second conference participant, and determining the normalized resolutions comprises increasing a resolution of a portion of the initial video stream corresponding to the first region of interest by a first amount to cause the first conference participant to appear at a first size and quality level within a first user interface tile of the user interface tiles; and increasing a resolution of a portion of the initial video stream corresponding to the second region of interest by a second amount to cause the second conference participant to appear at a second size and quality level within a second user interface tile of the user interface tiles, wherein the second amount is greater than the first amount.

In some implementations of the method, non-transitory computer readable medium, or apparatus, the first conference participant is located closer to the video capture device than the second conference participant, and determining the normalized resolutions comprises decreasing a resolution of a portion of the initial video stream corresponding to the first region of interest to cause the first conference participant to appear at a first size and a first quality level within a first user interface tile of the user interface tiles; and increasing a resolution of a portion of the initial video stream corresponding to the second region of interest to cause the second conference participant to appear at a second size and second quality level within a second user interface tile of the user interface tiles, wherein the first size and the second size are within a size range of each other, and wherein the first quality level and the second quality level are within a quality range of each other.

In some implementations of the method, non-transitory computer readable medium, or apparatus, determining the normalized resolutions for the first and second regions of interest comprises constraining the normalized resolutions based on a maximum resolution of a second video capture device within the physical space.

In some implementations of the method, non-transitory computer readable medium, or apparatus, determining the normalized resolutions for the first and second regions of interest comprises obtaining data indicative of the first and second regions of interest from the video capture device.

In some implementations of the method, non-transitory computer readable medium, or apparatus, determining the normalized resolutions for the first and second regions of interest comprises receiving the initial video stream from the video capture device; and processing the initial video stream to detect the first region of interest and the second region of interest.

In some implementations of the method, non-transitory computer readable medium, or apparatus, the normalized resolutions are based on a first distance between the first conference participant and the video capture device within the physical space and a second distance between the second conference participant and the video capture device within the physical space.

In some implementations of the method, non-transitory computer readable medium, or apparatus, the normalized resolutions are higher than a resolution of the initial video stream.

In some implementations of the method, non-transitory computer readable medium, or apparatus, determining the normalized resolutions comprises increasing a resolution of a portion of the initial video stream corresponding to the first region of interest by a first amount; and increasing a resolution of a portion of the initial video stream corresponding to the second region of interest by a second amount greater than the first amount.

In some implementations of the method, non-transitory computer readable medium, or apparatus, determining the normalized resolutions comprises decreasing a resolution of a portion of the initial video stream corresponding to the first region of interest by a first amount to cause the first conference participant to appear at a first size and a second quality level; and increasing a resolution of a portion of the initial video stream corresponding to the second region of interest by a second amount to cause the second conference participant to appear at a second size within a range of the first size and a second quality level within a range of the first quality level.

In some implementations of the method, non-transitory computer readable medium, or apparatus, the normalized resolutions are updated based on a detection of a new video capture device within the physical space.

In some implementations of the method, non-transitory computer readable medium, or apparatus, responsive to detecting a movement of the first conference participant affecting the conformance of the sizes and quality levels of the first and second conference participants within the separate user interface tiles, a message recommending that the first conference participant cease the movement is output.

In some implementations of the method, non-transitory computer readable medium, or apparatus, the normalized resolutions are determined based on at least one of a room condition associated with the physical space, a network condition associated with the physical space, or a device constraint associated with the physical space.

In some implementations of the method, non-transitory computer readable medium, or apparatus, the normalized resolutions represent an increase to a resolution of a portion of the initial video stream corresponding to the first region of interest by a first amount and an increase to a resolution of a portion of the initial video stream corresponding to the second region of interest by a second amount greater than the first amount.

In some implementations of the method, non-transitory computer readable medium, or apparatus, the normalized resolutions represent a decrease to a resolution of a portion of the initial video stream corresponding to the first region of interest by a first amount and an increase to a resolution of a portion of the initial video stream corresponding to the second region of interest by a second amount, wherein the decrease by the first amount causes the first conference participant to appear at a first size and at a first quality level and the increase by the second amount causes the second conference participant to appear at a second size within a range of the first size and at a second quality level within a range of the first quality level.

In some implementations of the method, non-transitory computer readable medium, or apparatus, determining the normalized resolutions comprises determining a first distance between the first conference participant and the video capture device within the physical space; determining a second distance between the second conference participant and the video capture device within the physical space; and determining the normalized resolutions based on a relationship between the first distance and the second distance.

In some implementations of the method, non-transitory computer readable medium, or apparatus, the first and second regions of interest are determined based on metadata obtained from the video capture device.

In some implementations of the method, non-transitory computer readable medium, or apparatus, candidate regions of interest within initial video streams obtained from multiple video capture devices within the physical space are evaluated to determine to use at least one of the first region of interest or the second region of interest.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
determining normalized resolutions for multiple regions of interest of one or more initial video streams;
determining that a conference participant appears in more than one of the multiple regions of interest;
evaluating the more than one of the multiple regions of interest to determine a region of interest for the conference participant having a highest score, wherein the score is based on one or more of a size of a face of the conference participant, a percentage of the face of the conference participant that is visible, and a presence of another conference participant within a threshold distance of the face of the conference participant; and
causing a video capture device to capture, at the determined normalized resolutions, the region of interest for the conference participant having the highest score.

2. The method of claim 1, wherein the video capture device is located within a physical space and each of the multiple regions of interest is associated with a different conference participant within the physical space.

3. The method of claim 1, wherein normalized resolution conform sizes and quality levels of conference participants depicted within separate user interface tiles.

4. The method of claim 1, wherein the multiple regions of interest are identified at the one or more video capture devices, the method comprising:
transmitting, to the one or more video capture devices, instructions configured to cause the one or more video capture devices to capture the one or more video streams.

5. The method of claim 1, wherein determined normalized resolution for the region of interest for the conference participant having the highest score is an increased resolution.

6. The method of claim 1, wherein the determined normalized resolution for the region of interest for the conference participant having the highest score is a decreased resolution.

7. The method of claim 1, wherein the normalized resolutions are based on distances between one or more video capture devices and each of multiple conference participants within a physical space in which the one or more video capture devices are located.

8. The method of claim 1, wherein the normalized resolutions are based on at least one of a room condition, a network condition, or a device constraint.

9. A non-transitory computer readable medium storing instructions operable to cause one or more processors to perform operations comprising:
determining normalized resolutions for multiple regions of interest of one or more video streams;
determining that a conference participant appears in more than one of the multiple regions of interest;
evaluating the more than one of the multiple regions of interest to determine a region of interest for the conference participant having a highest score, wherein the score is based on one or more of a size of a face of the conference participant, a percentage of the face of the conference participant that is visible, and a presence of another conference participant within a threshold distance of the face of the conference participant; and
causing a video capture device to capture, at the determined normalized resolutions, the region of interest for the conference participant having the highest score.

10. The non-transitory computer readable medium of claim 9, wherein the multiple regions of interest are determined based on object detection performed against one or more video frames of the one or more video streams.

11. The non-transitory computer readable medium of claim 9, wherein the multiple regions of interest are determined based on metadata obtained from the video capture device.

12. The non-transitory computer readable medium of claim 9, wherein normalized resolutions conform sizes and quality levels of conference participants depicted within separate user interface tiles within which the one or more video streams are output for rendering.

13. The non-transitory computer readable medium of claim 9, wherein the normalized resolutions are higher than an initial resolution of the one or more video streams.

14. An apparatus, comprising:
a memory; and
a processor configured to execute instructions stored in the memory to:
determine normalized resolutions for multiple regions of interest of one or more video streams;
determine that a conference participant within a physical space in which the video capture device is located appears in more than one of the multiple regions of interest;
evaluate the more than one of the multiple regions of interest to determine a region of interest for the conference participant having a highest score, wherein the score is based on one or more of a size of a face of the conference participant, a percentage of the face of the conference participant that is visible, and a presence of another conference participant within a threshold distance of the face of the conference participant; and
cause a video capture device to capture, at the determined normalized region of interest for the conference participant having the highest score.

15. The apparatus of claim 14, wherein, to determine the normalized resolutions, the processor is configured to execute the instructions to:
determine to increase resolutions for each of the multiple regions of interest.

16. The apparatus of claim 14, wherein, to determine the normalized resolutions, the processor is configured to execute the instructions to:
determine to increase resolutions for a first group of the multiple regions of interest; and
determine to decrease resolutions for a second group of the multiple regions of interest.

17. The apparatus of claim 14, wherein, to determine the normalized resolutions, the processor is configured to execute the instructions to:
scale each of the multiple regions of interest to cause an adjustment to sizes of conference participants depicted in the multiple regions of interest.

18. The apparatus of claim 14, wherein, to cause the video capture device to capture the region of interest, the processor is configured to execute the instructions to:
instruct the video capture device to capture the one or more video streams at the normalized resolutions.

19. The apparatus of claim 14, wherein the normalized resolutions are based on distance modeling for locations around a physical space within which the video capture device is located.

* * * * *